(12) United States Patent
Ko et al.

(10) Patent No.: US 12,015,991 B2
(45) Date of Patent: Jun. 18, 2024

(54) METHOD AND DEVICE FOR GENERATING SIDELINK SYNCHRONIZATION SIGNAL BLOCK IN WIRELESS COMMUNICATION SYSTEM

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 17/593,938

(22) PCT Filed: Mar. 27, 2020

(86) PCT No.: PCT/KR2020/004246
§ 371 (c)(1),
(2) Date: Sep. 28, 2021

(87) PCT Pub. No.: WO2020/204504
PCT Pub. Date: Oct. 8, 2020

(65) Prior Publication Data
US 2022/0201630 A1 Jun. 23, 2022

(30) Foreign Application Priority Data

Mar. 29, 2019 (KR) .................. 10-2019-0037429

(51) Int. Cl.
| | | |
|---|---|---|
| *H04W 56/00* | (2009.01) | |
| *H04W 52/52* | (2009.01) | |
| *H04W 92/18* | (2009.01) | |

(52) U.S. Cl.
CPC ......... *H04W 56/001* (2013.01); *H04W 52/52* (2013.01); *H04W 92/18* (2013.01)

(58) Field of Classification Search
CPC .......... H04J 11/00; H04L 27/26; H04W 4/40; H04W 4/44; H04W 4/46; H04W 4/48;
(Continued)

(56) References Cited

U.S. PATENT DOCUMENTS 10,454,743 B2 * 10/2019 Chae .................... H04J 11/0076
10,631,254 B2 * 4/2020 Lee .................... H04L 25/03006
(Continued)

FOREIGN PATENT DOCUMENTS

| KR | 20170048415 | 5/2017 |
| KR | 20170112799 | 10/2017 |

OTHER PUBLICATIONS

ITL, Considerations on sidelink synchronization for NR V2X, 3GPP TSG RAN WG1 Meeting #95, R1-1813493, 7 pages, Nov. 2018.*
(Continued)

*Primary Examiner* — Frank Duong
(74) *Attorney, Agent, or Firm* — LEE, HONG, DEGERMAN, KANG & WAIMEY

(57) ABSTRACT

Proposed is a method for a first device to perform wireless communication. The method may include a step for generating a sidelink synchronization signal block (S-SSB) including a sidelink primary synchronization signal (SPSS), a sidelink secondary synchronization signal (SSSS), and a sidelink physical broadcast channel (PSBCH), and transmitting the S-SSB to a second device. For example, at least one of an SPSS-related symbol period, an SSSS-related symbol period, or a PSBCH-related symbol period may include a transition period. For example, the transition period may be determined on the basis of at least one of the priority of the SPSS, the priority of the SSSS, or the priority of the PSBCH.

19 Claims, 24 Drawing Sheets

(58) Field of Classification Search
CPC ....... H04W 4/70; H04W 52/52; H04W 56/00; H04W 56/001; H04W 92/18
See application file for complete search history.

(56) References Cited

U.S. PATENT DOCUMENTS

| | | | | |
|---|---|---|---|---|
| 10,631,259 | B2* | 4/2020 | Lim | H04L 5/1469 |
| 11,632,727 | B2* | 4/2023 | Ryu | H04L 5/0091 |
| | | | | 370/329 |
| 11,695,531 | B2* | 7/2023 | Khoryaev | H04L 1/1854 |
| | | | | 370/330 |
| 2017/0289934 | A1* | 10/2017 | Sheng | H04W 56/001 |
| 2019/0306923 | A1* | 10/2019 | Xiong | H04J 13/0062 |
| 2020/0015214 | A1* | 1/2020 | Si | H04W 76/14 |
| 2022/0086782 | A1* | 3/2022 | Chen | H04L 5/001 |

OTHER PUBLICATIONS

PCT International Application No. PCT/KR2020/004246, International Search Report dated Jul. 6, 2020, 4 pages.

Intel Corporation, "Synchronization for NR V2X Sidelink Communication," R1-1902483, 3GPP TSG RAN WG1 RAN1#96, Mar. 2019, 15 pages.

LG Electronics, "Update to PSSS/SSSS time mask for V2X Communication / Non-concurrent with E-UTRA uplink transmissions," R5-182534, 3GPP TSG-RAN WG5 Meeting #79, May 2018, 6 pages.

VIVO, "NR sidelink synchronization mechanism," R1-1901684, 3GPP TSG RAN WG1 #96, Mar. 2019, 13 pages.

* cited by examiner

FIG. 4
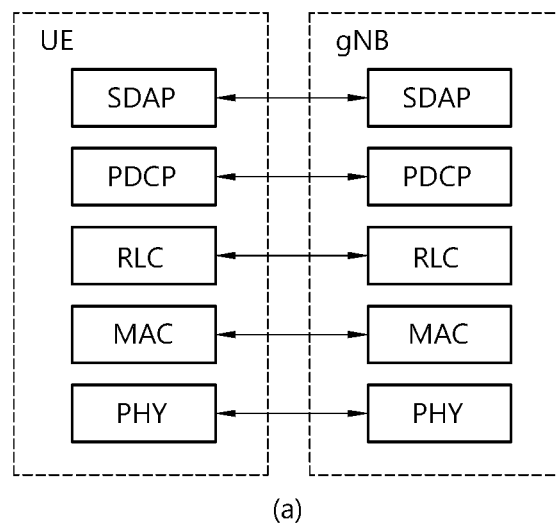
(a)
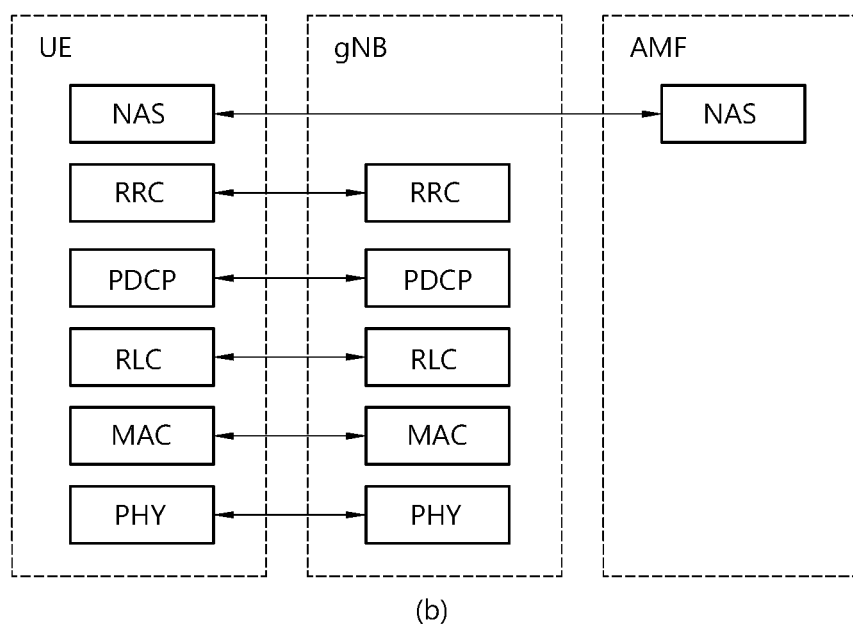
(b)

FIG. 8
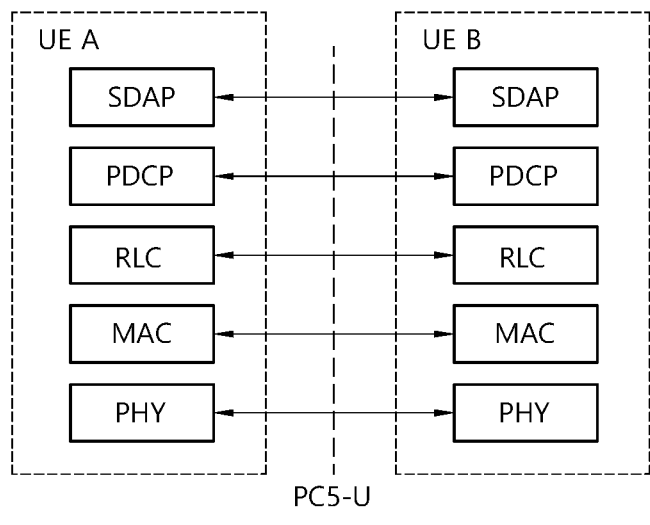
(a)
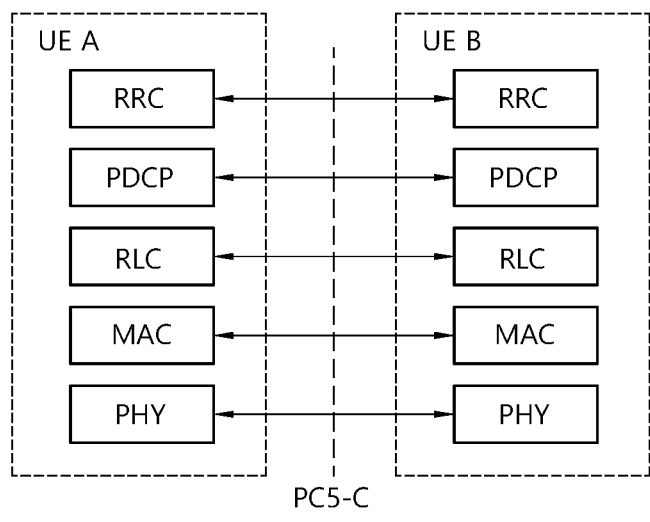
(b)

FIG. 18 receiving, from first device, S-SSB including SPSS, SSSS and PSBCH — S1810

METHOD AND DEVICE FOR GENERATING SIDELINK SYNCHRONIZATION SIGNAL BLOCK IN WIRELESS COMMUNICATION SYSTEM

CROSS-REFERENCE TO RELATED APPLICATIONS

This application is the National Stage filing under 35 U.S.C. 371 of International Application No. PCT/KR2020/004246, filed on Mar. 27, 2020, which claims the benefit of earlier filing date and right of priority to Korean Application No. 10-2019-0037429, filed on Mar. 29, 2019, the contents of which is hereby incorporated by reference herein in its entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, due to the importance of a synchronization signal block (SSB), it may be necessary to optimize transmit power according to characteristics of each signal included in the SSB in order to maximize the reception and decoding performance of the SSB. That is, for example, based on a peak to average power ratio (PAPR) of each signal included in the SSB, etc., maximum power reduction (MPR) for determining transmit power of each signal included in the actual SSB may be adjusted. In this case, if PAPR values of each signal included in the SSB are different from each other, the required MPR values may also be different from each other. For example, when a UE transmits each of the signals, the UE may apply an optimal MPR to each of the signals in order to maximize reception performance for each of the signals. Accordingly, a transmitter amplifier of the UE may apply a time mask to perform an amplification operation according to different average powers for each signal. The time mask may preserve the time necessary for the transmitter amplifier of the UE to operate normally at the boundary where transmit power is changed. Through this duration, the transmitter amplifier of the UE may transition from an operation of amplifying power to transmit current signal(s) to an operation of amplifying power to transmit next signal(s).

Technical Solutions

In one embodiment, a method for performing wireless communication by a first device is provided. The method may include: generating a sidelink synchronization signal block (S-SSB) including a sidelink primary synchronization signal (SPSS), a sidelink secondary synchronization signal (SSSS) and a sidelink physical broadcast channel (PSBCH); and transmitting, to a second device, the S-SSB. For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 18 shows a method for a second device (200) to receive a S-SSB from a first device (100), based on an embodiment of the present disclosure.

DESCRIPTION OF EXEMPLARY EMBODIMENTS

Figure 1:
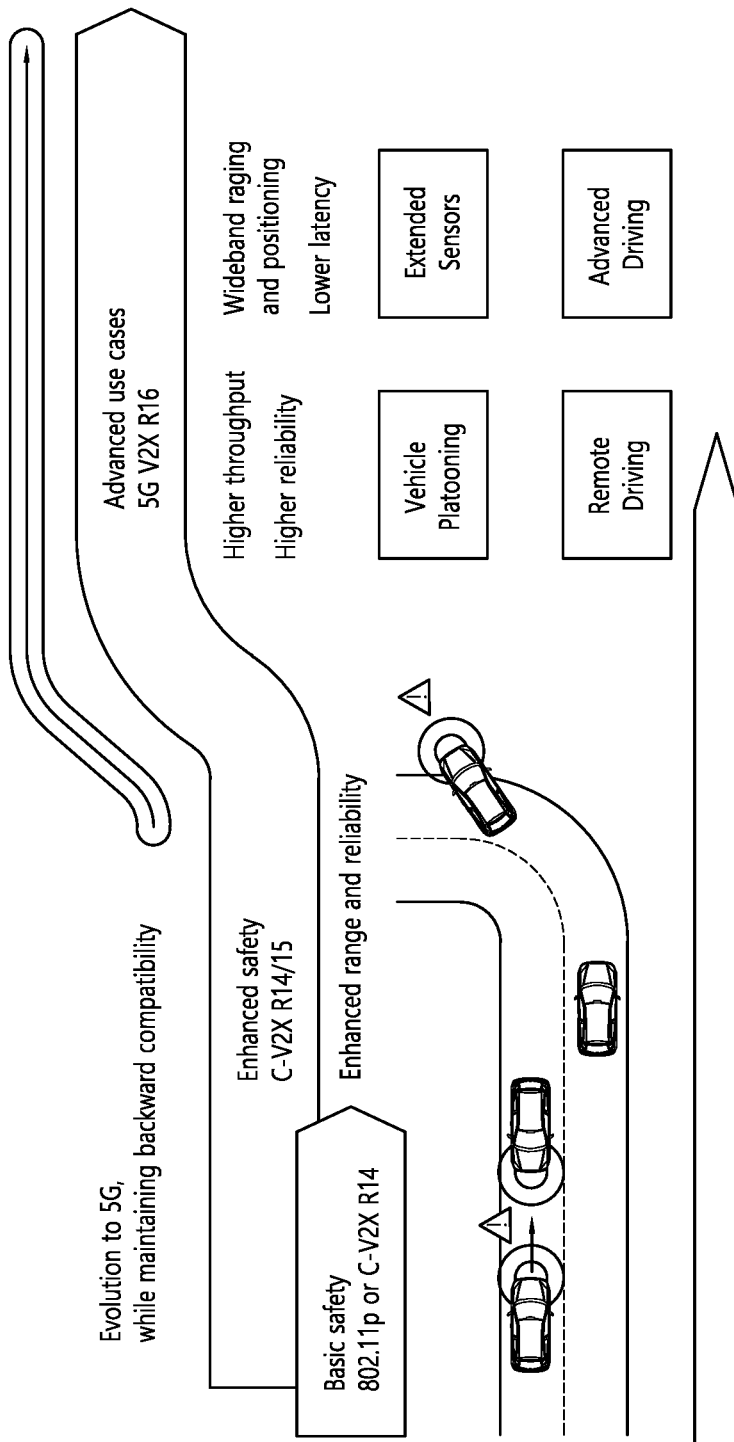
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
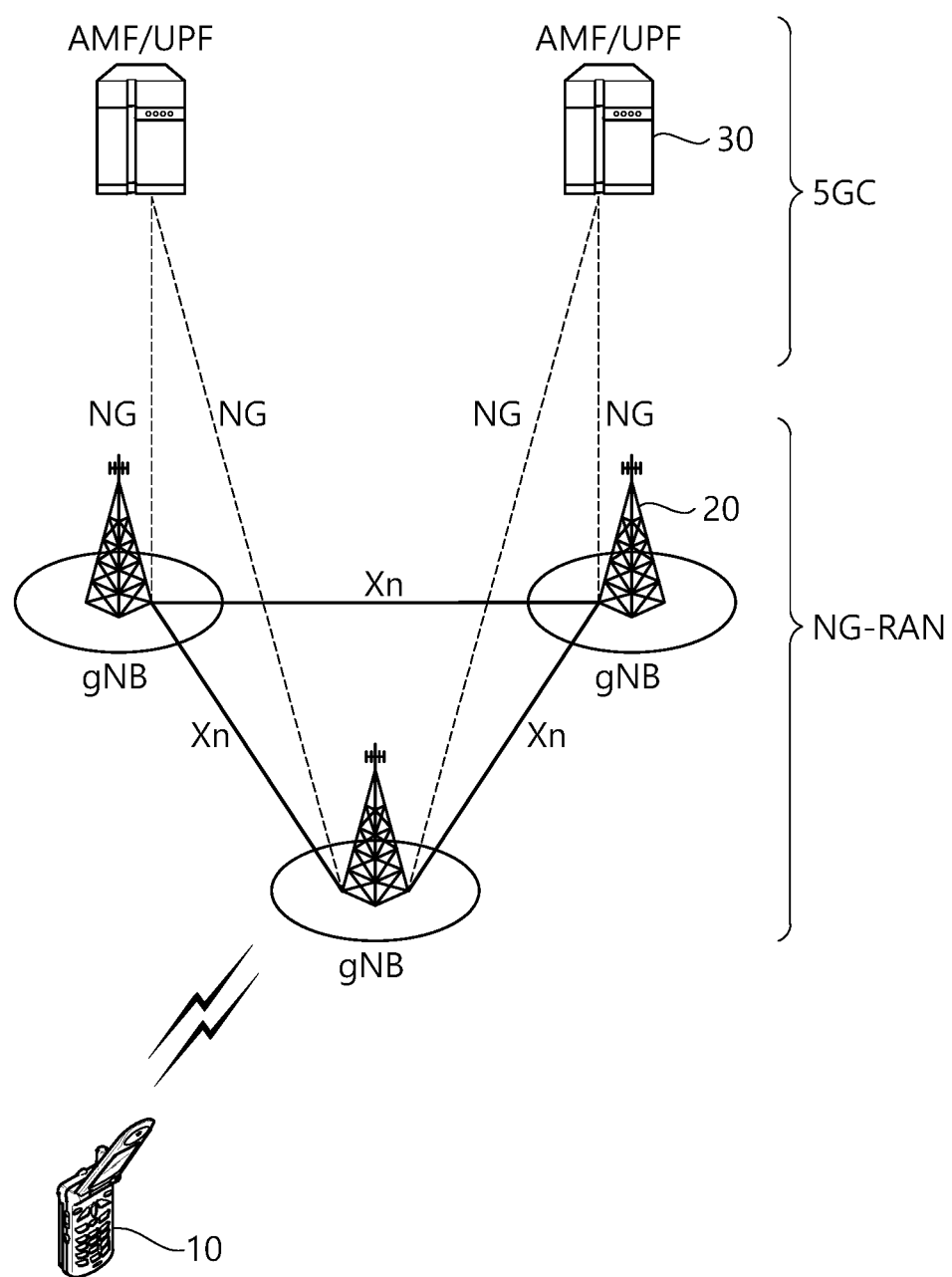
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
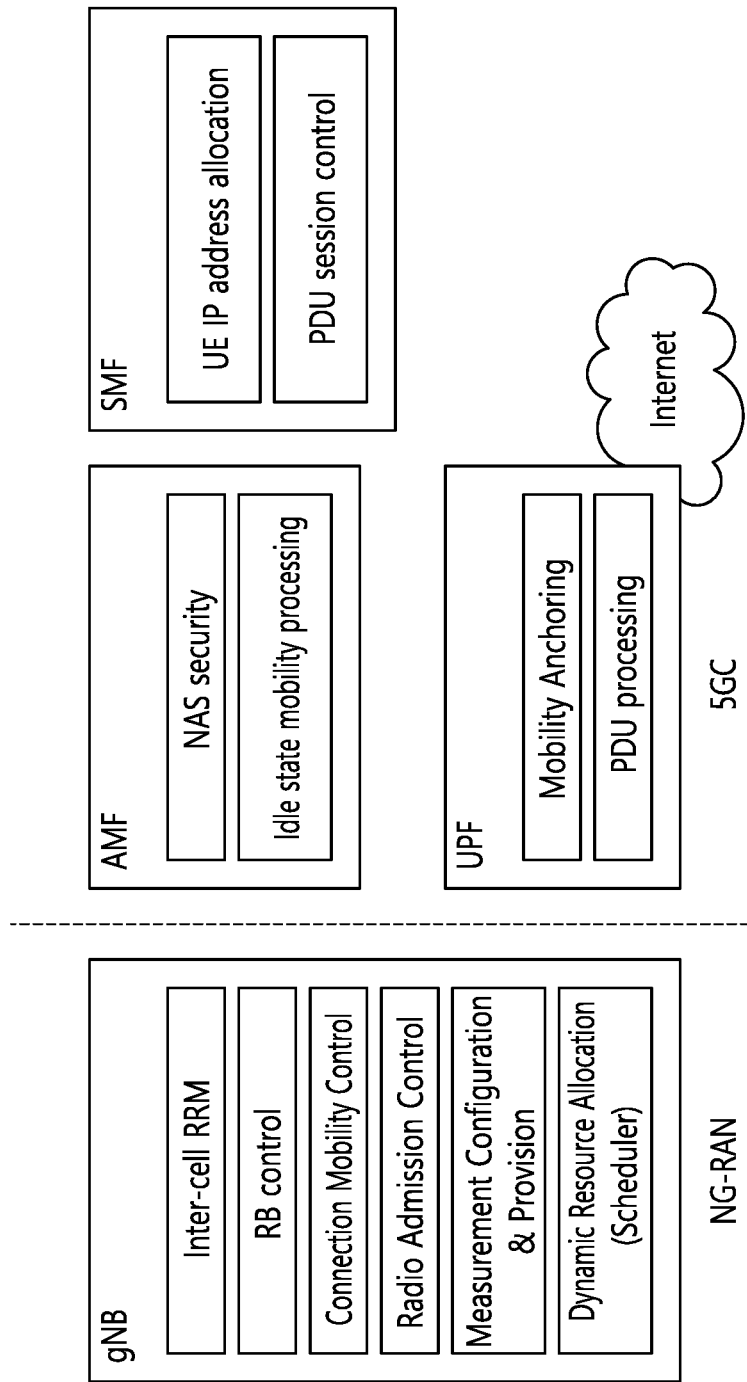
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
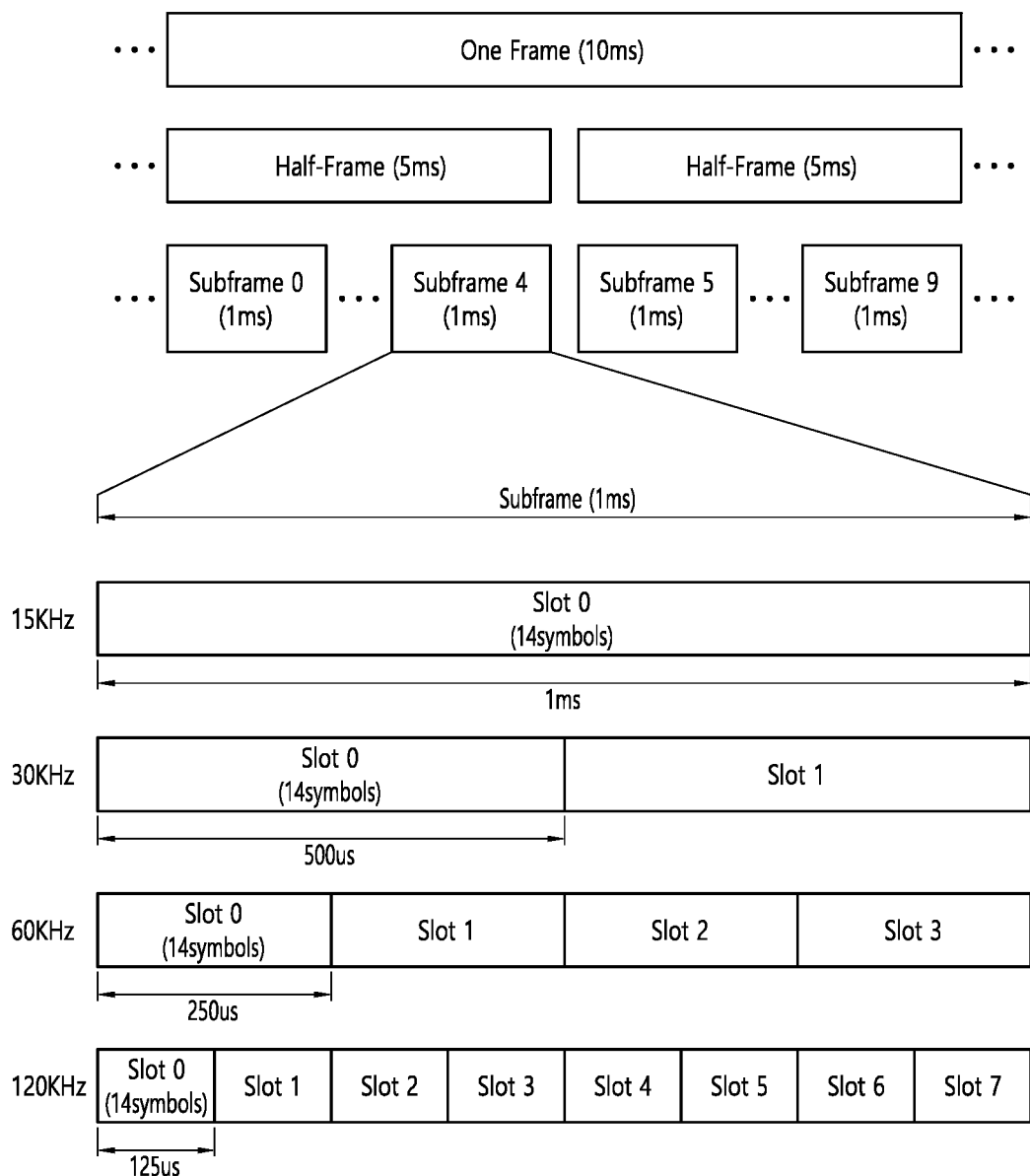
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
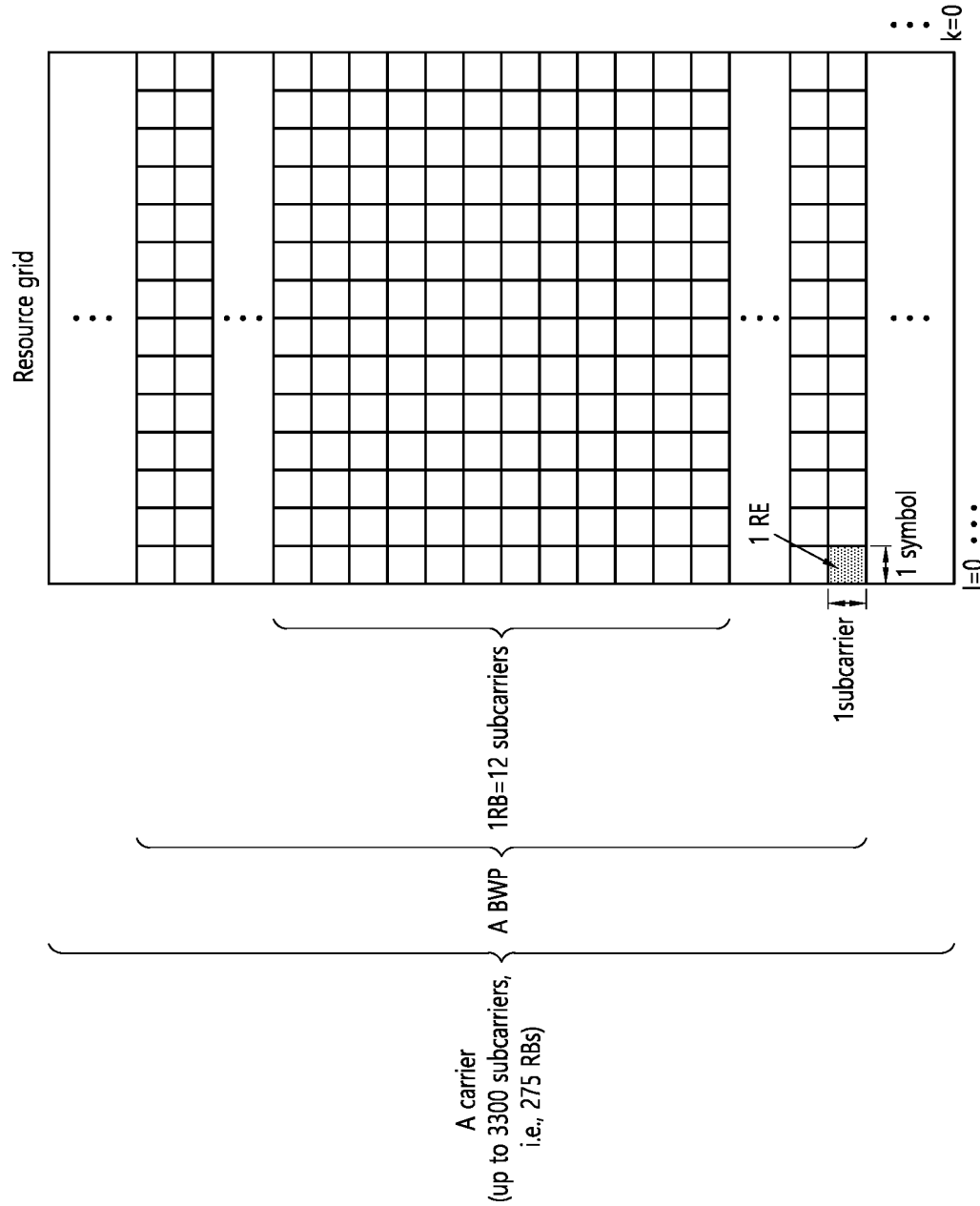
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
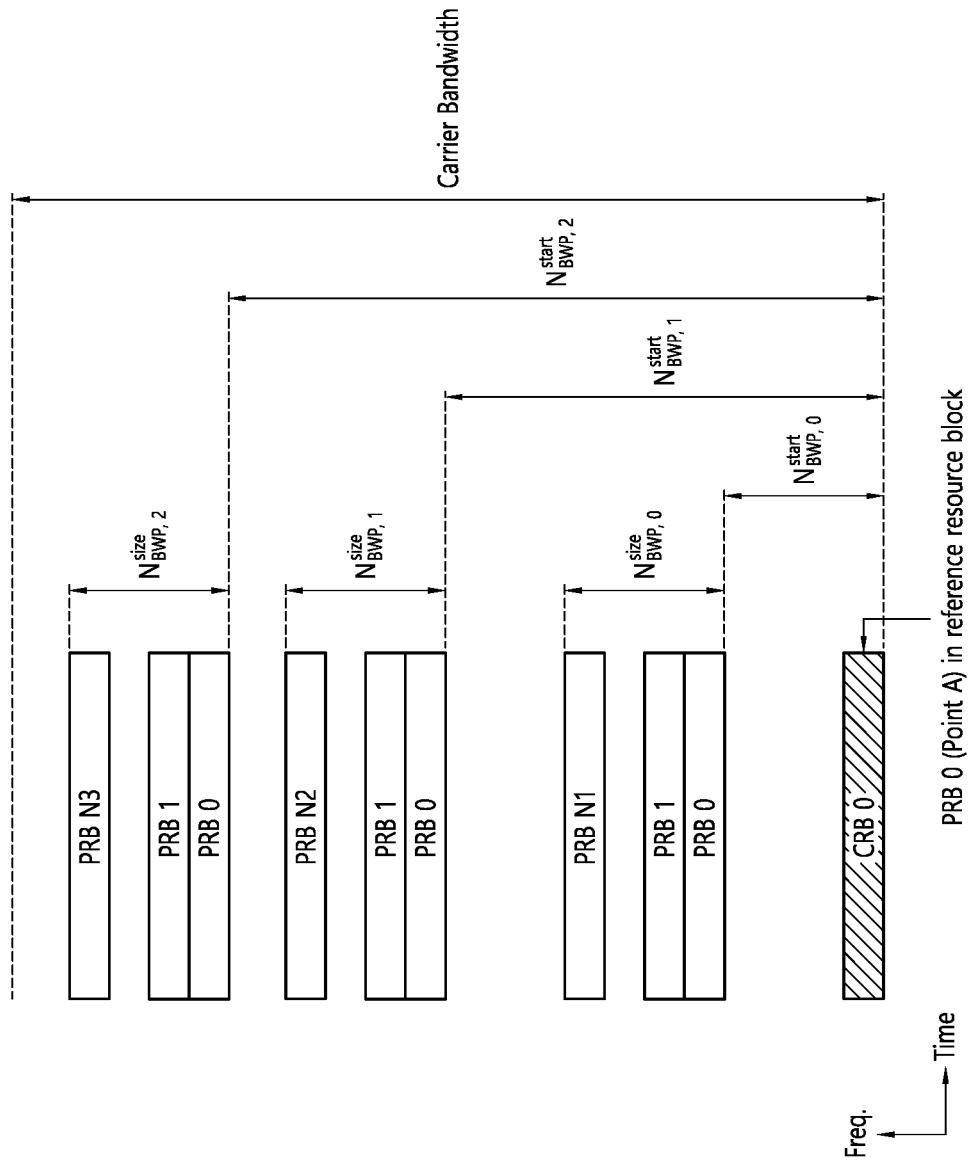
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
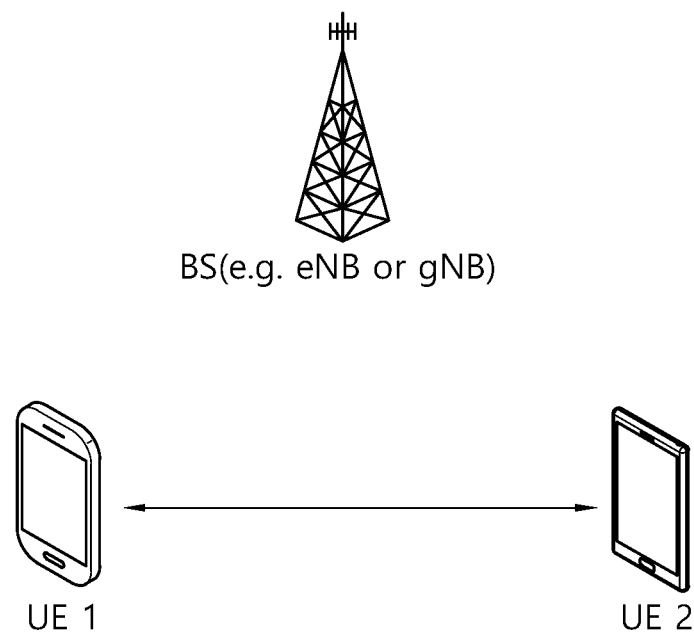
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
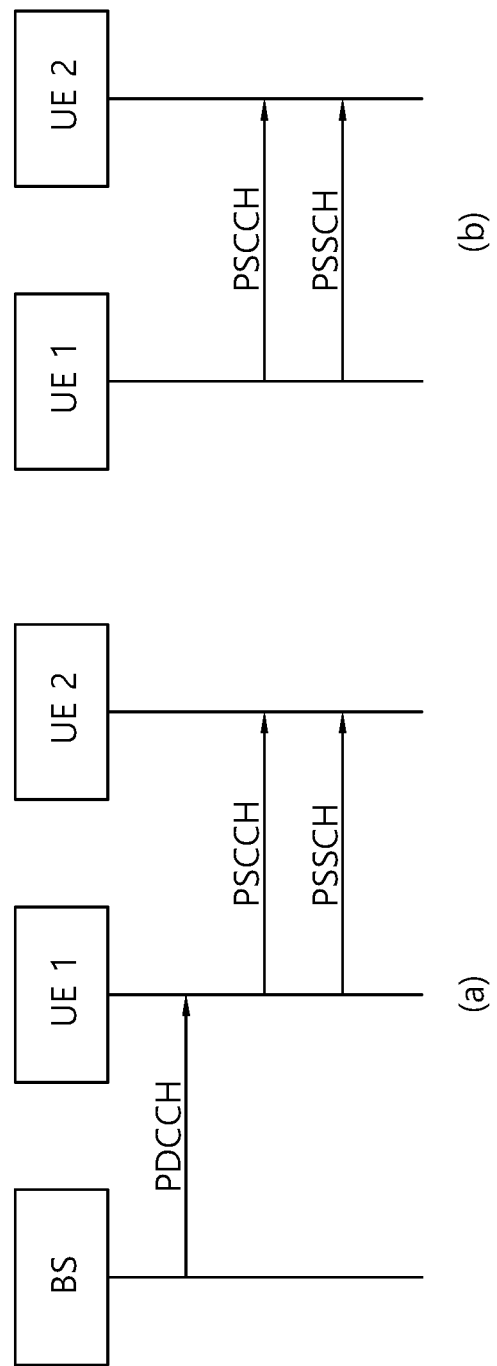
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
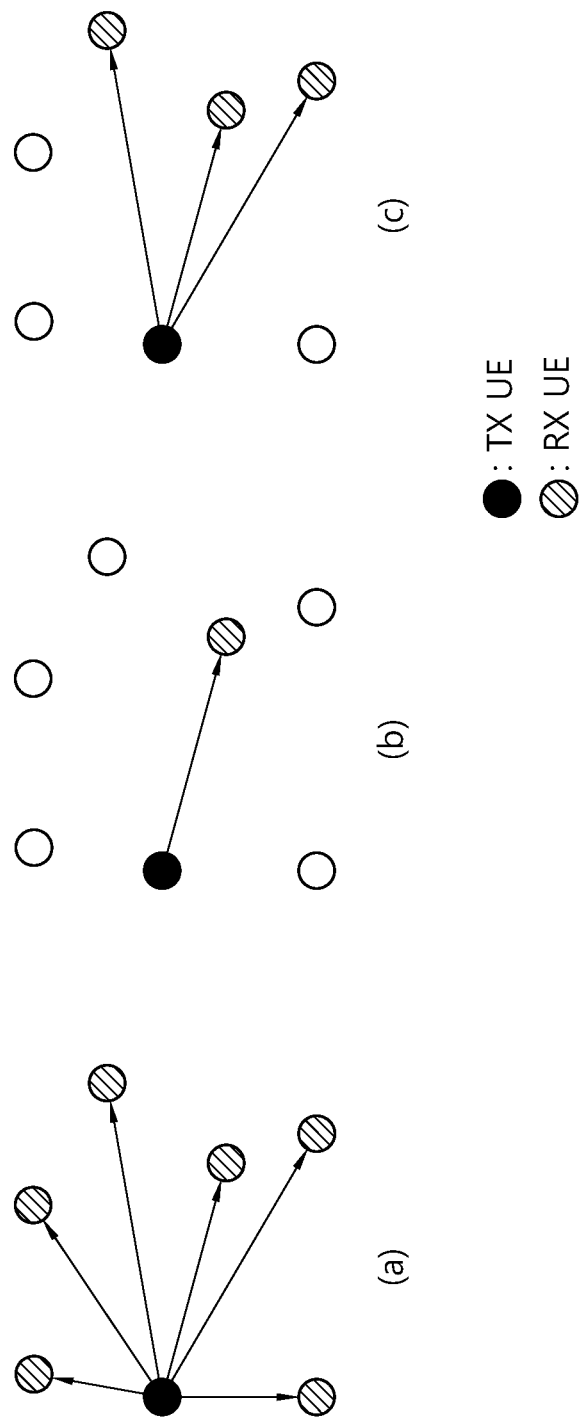
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, service(s) for communication such as an autonomous vehicle, a smart car, or a connected car may be considered. For this service, each vehicle may transmit and receive information as a communication UE, select resource(s) for communication with or without a help of base station depending on situations, and transmit and receive message(s) between UEs.

Meanwhile, in the sidelink communication system, a synchronization signal block (SSB) used for initial access may include sidelink primary synchronization signal(s) (SL-PSS(s)) (hereinafter, PSS), sidelink secondary synchronization signal(s) (SL-SSS(s)) (hereinafter, SSS) and a sidelink physical broadcast channel (SL-PBCH) (hereinafter, PSBCH). For example, the PSS may be used to detect initial signal(s) and perform synchronization, and the SSS may be used together with the PSS to detect detailed synchronization and synchronization signal ID, and the PSBCH may be used to signal basic system information. Thus, each of the above signals may be important signals for obtaining synchronization and basic system information. In addition, reception and/or decoding of each of the signals may be initially performed for normal data communication.

Due to the importance of the above-described SSB, it may be necessary to optimize transmit power according to characteristics of each signal included in the SSB in order to maximize the reception and decoding performance of the SSB. That is, for example, based on a peak to average power ratio (PAPR) of each signal included in the SSB, etc., maximum power reduction (MPR) for determining transmit power of each signal included in the actual SSB may be adjusted. In this case, if PAPR values of each signal included in the SSB are different from each other, the required MPR values may also be different from each other. For example, when a UE transmits each of the signals, the UE may apply an optimal MPR to each of the signals in order to maximize reception performance for each of the signals. Accordingly, a transmitter amplifier of the UE may apply a time mask to perform an amplification operation according to different average powers for each signal. The time mask may preserve the time necessary for the transmitter amplifier of the UE to operate normally at the boundary where transmit power is changed. Through this duration, the transmitter amplifier of the UE may transition from an operation of amplifying power to transmit current signal(s) to an operation of amplifying power to transmit next signal(s).

Hereinafter, based on various embodiments of the present disclosure, a method of applying an optimal time mask according to characteristic of each signal included in the SSB in order to prevent deterioration of reception performance due to an operation of the transmitter amplifier of the UE will be described.

In various embodiments of the present disclosure, each signal of the SSB considered to configure a time mask may be configured as follows. For example, the PSS may be cyclic prefix based orthogonal frequency division multiplex (CP-OFDM) signal(s) modulated with an m-sequence in a frequency domain. For example, the SSS may be CP-OFDM signal(s) modulated with gold-sequence in a frequency domain. For example, the PSBCH may be CP-OFDM signal(s) modulated with quadrature phase shift keying (QPSK) in a frequency domain.

It is assumed that each signal of the above-described SSB has different PAPR values. For example, a PAPR of the PSS may be about 4 to 5 dB, and a PAPR of the SSS may be about 6 to 9 dB, and a PAPR of the PSBCH may be about 7 to 10 dB. In this case, the PAPR of the PSS and the PAPR of the SSS have a difference of about 2 to 4 dB, and the PAPR of the SSS and the PAPR of the PSBCH have a difference of about 1 dB.

Accordingly, a time mask may be applied in the following ways.

1) Apply the same MPR (e.g., no time mask applied)
2) Apply different MPRs between the PSS and the SSS/PSBCH
3) Apply different MPRs to each of PSS, SSS and PSBCH In the case of the first method, since the UE transmits signals having different PAPR values with the same power, for example, the UE may operate based on the signal having the highest PAPR to prevent deterioration of reception performance due to the PAPR. Accordingly, the PSS or the SSS having a low PAPR may be transmitted with transmit power lower than an optimal transmit power value, and reception performance for each signal may be deteriorated. That is, since the same MPR is applied to transmit power of the PSS and/or the SSS having a low PAPR, the PSS and/or the SSS may be transmitted with transmit power lower than the optimal transmit power value. For example, in order to prevent deterioration of reception performance, the UE may increase the number of times the signal(s) is repeatedly transmitted by increasing the number of symbols used for the PSS and/or the SSS. Alternatively, for example, in order to prevent deterioration of reception performance, the UE may decrease an effective code rate for transmission information.

In the second method, since the PAPR value of the PSS is lower than the PAPR value of the SSS/PSBCH, the UE may transmit the PSS with transmit power higher than transmit power of the SSS/PSBCH. For example, the UE may apply a transition period to a pre-PSS period and a post-PSS period in a time domain, by applying a time mask to the PSS. In this case, for example, the UE may apply the transition period based on characteristics of each of signals and a priority of information transmitted according to the purpose for which each of the signals is used in the communication system. For example, a priority of each of signals included in the SSB may be determined in consideration of the following criteria.
1) Protect the PSS, which is the first synchronization signal required for communication system
2) Protect the SSS, which requires reception performance, used for transmitting multiple synchronization signal IDs
3) Protects the PSBCH, which requires reception performance, used for transmitting basic system information For the protection of each of the above-described signals, the following guard period may be considered.
1) Apply an automatic gain control (AGC) period to the first part of the time period (e.g., slot) related to the signal
2) Apply a specific time period that acts as a guard to a transition period
3) Apply a transition period to the time period related to the signal without a separate guard period For example, since the UE decodes the SSS based on an initial synchronization after the UE obtain the initial synchronization through the PSS, the influence of the doppler effect due to time selective fading may be minimized as the PSS and the SSS become closer in time. Therefore, based on an embodiment of the present disclosure, the PSS and the SSS may be configured to be close in time.

In various embodiments of the present disclosure, the applicable frequency band may be FR1 (e.g., 7 GHz or less) and FR2 (e.g., 7 GHz to 52.6 GHz). Also, for example, a subcarrier spacing to be used for OFDM signal(s) in FR1 may be 15/30/60 kHz, and a subcarrier spacing to be used for OFDM signal(s) in FR2 may be 60/120 kHz. Also, for example, the transition period applied to FR1 may be 10 us, and the transition period applied to FR2 may be 5 us. Also, for example, when 15/30/60/120 kHz subcarrier spacing is applied, the length of one OFDM symbol may be about 71.4 us, 35.7 us, 17.9 us, and 8.9 us, respectively.

Hereinafter, examples of a transition period in consideration of guard period and protection of each signal based on the second method will be described.

Figure 12:
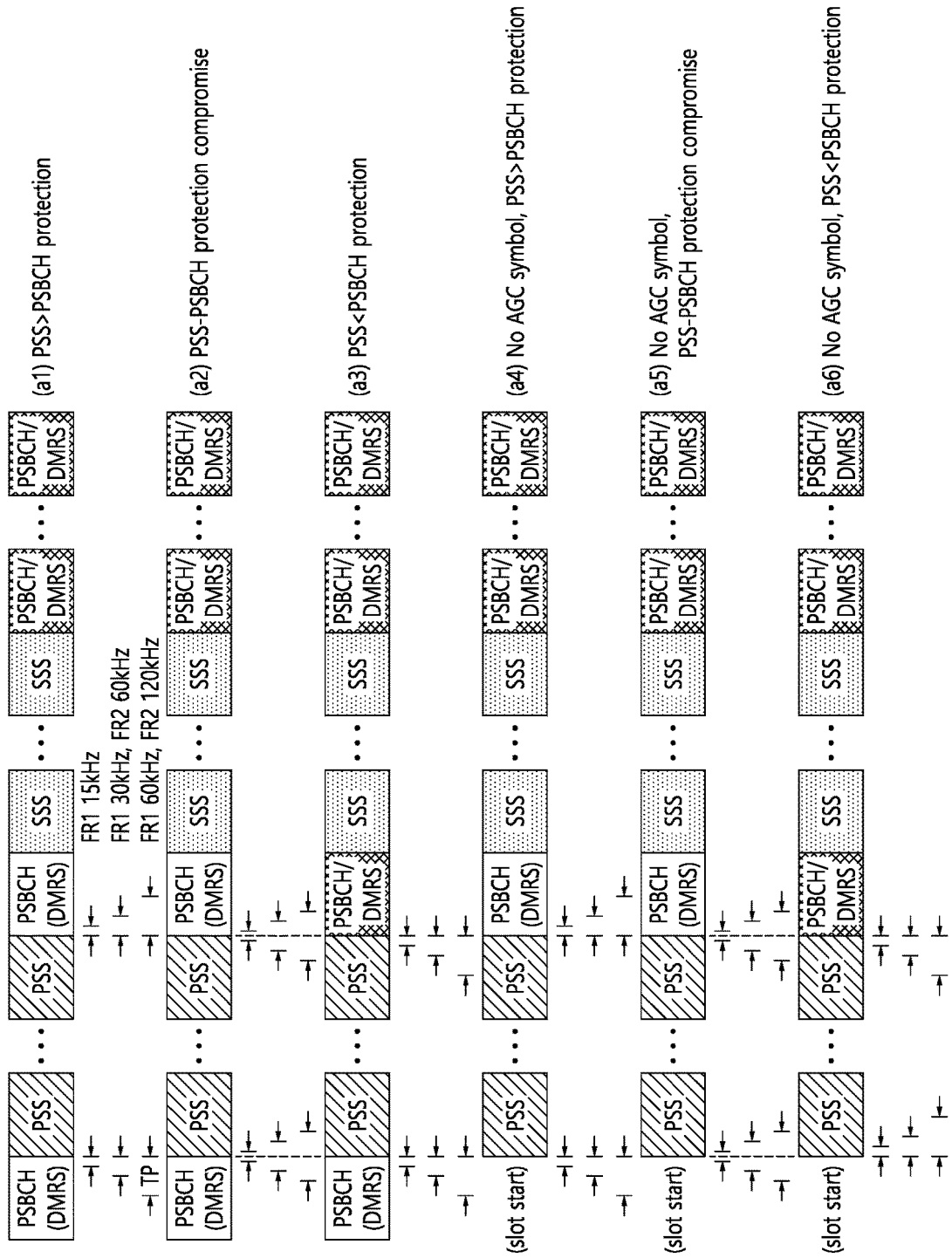
FIG. 12 shows examples of applying a transition period to a symbol period related to SSB, based on an embodiment of the present disclosure.

FIG. 12 shows examples of applying a transition period to a symbol period related to SSB, based on an embodiment of the present disclosure. The embodiment of FIG. 12 may be combined with various embodiments of the present disclosure.

Referring to FIG. 12, a period indicated by an arrow represents a transition period according to each transmission parameter. For example, the shortest length period represents a transition period corresponding to 15 kHz subcarrier spacing in FR1, and the middle length period represents a transition period corresponding to 30 kHz subcarrier spacing in FR1 or a transition period corresponding to 60 kHz subcarrier spacing in FR2, and the longest length period represents a transition period corresponding to 60 kHz subcarrier spacing in FR1 or a transition period corresponding to 120 kHz subcarrier spacing in FR2. For example, the number of PSS symbols, SSS symbols, and PSBCH symbols may be determined based on an amount of transmitted information, a required signal to noise ratio (SNR), and/or a time delay condition, etc.

Option (a1) shows an example in which the highest priority is applied to PSS protection. For example, a PSBCH symbol period may be configured/determined to be located in a time period before/after a PSS symbol period, and a time mask transition period may be configured/determined to be located in a part of the PSBCH symbol period. For this reason, there is no transition period in the PSS symbol period, and loss of the PSS symbol period may not occur. Also, for example, in order to protect the SSS, the PSBCH symbol period may be configured/determined to be located between the PSS symbol period and a SSS symbol period. For this reason, a part of the PSBCH symbol period may equally serve as a transition period. In this case, for example, the PSBCH symbol period may not include DMRS(s) in consideration of the loss due to the transition period. In particular, for example, in the case of a symbol to which 60 kHz subcarrier spacing in FR1 and 120 kHz subcarrier spacing in FR2 is applied, since 50% or more of a period of the symbol may be used as a transition period, it may be difficult to decode information transmitted on the PSBCH symbol. Accordingly, in order to prevent deterioration of channel estimation performance, the symbol of the PSBCH may not include DMRS(s). Alternatively, for example, the PSBCH symbol period may include DMRS signal(s) if the loss according to the transition period is not large.

Option (a2) shows an example in which the same priority is applied to PSS protection and PSBCH protection. For example, half of a transition period may be configured/determined in a PSS symbol period, and half of the transition period may be configured/determined in a PSBCH symbol period.

Option (a3) shows an example in which a priority of PSBCH protection is higher than a priority of PSS protection. For example, a transition period between a PSS symbol period and a PSBCH symbol period may be configured/determined to be located in a part of the PSS symbol period. However, there may be a PSBCH symbol period used as an AGC symbol period in the preceding period of the first PSS symbol period. In this case, for example, a transition period may be configured/determined to be located in a part of the PSBCH symbol period used as the AGC symbol period.

Options (a4) to (a6) are different from options (a1) to (a3) in a case in which a PSBCH symbol used as an AGC symbol does not exist before the first PSS symbol period. In this case, the PSS may be mapped to the first symbol of the slot in which the UE starts SL transmission. Alternatively, the PSS may be mapped to any symbol in the slot related to SL transmission by the UE.

Option (a4) shows an example in which the highest priority is applied to PSS protection if there is no PSBCH symbol used as an AGC symbol. For example, a PSBCH symbol period may be configured/determined to be located in a time period before/after a PSS symbol period, and a time mask transition period may be configured/determined to be located in a part of the PSBCH symbol period. For this reason, there is no transition period in the PSS symbol period, and loss of the PSS symbol period may not occur. Also, for example, in order to protect the SSS, the PSBCH symbol period may be configured/determined to be located between the PSS symbol period and a SSS symbol period. For this reason, a part of the PSBCH symbol period may equally serve as a transition period.

Option (a5) shows an example in which the same priority is applied to PSS protection and PSBCH protection if there is no PSBCH symbol used as an AGC symbol. For example, half of a transition period may be configured/determined in a PSS symbol period, and half of the transition period may be configured/determined in a PSBCH symbol period.

Option (a6) shows an example in which a priority of PSBCH protection is higher than a priority of PSS protection if there is no PSBCH symbol used as an AGC symbol. For example, a transition period may be configured/determined to be located in a part of a PSS symbol period. However, since performance degradation may occur due to the transition period configured in a part of the PSS symbol period, for example, more PSS symbols may be configured to be included in the SSB in order for the UE to transmit more PSS in one SSB, or the UE may use a lower code rate for the PSS symbol.

Figure 13:
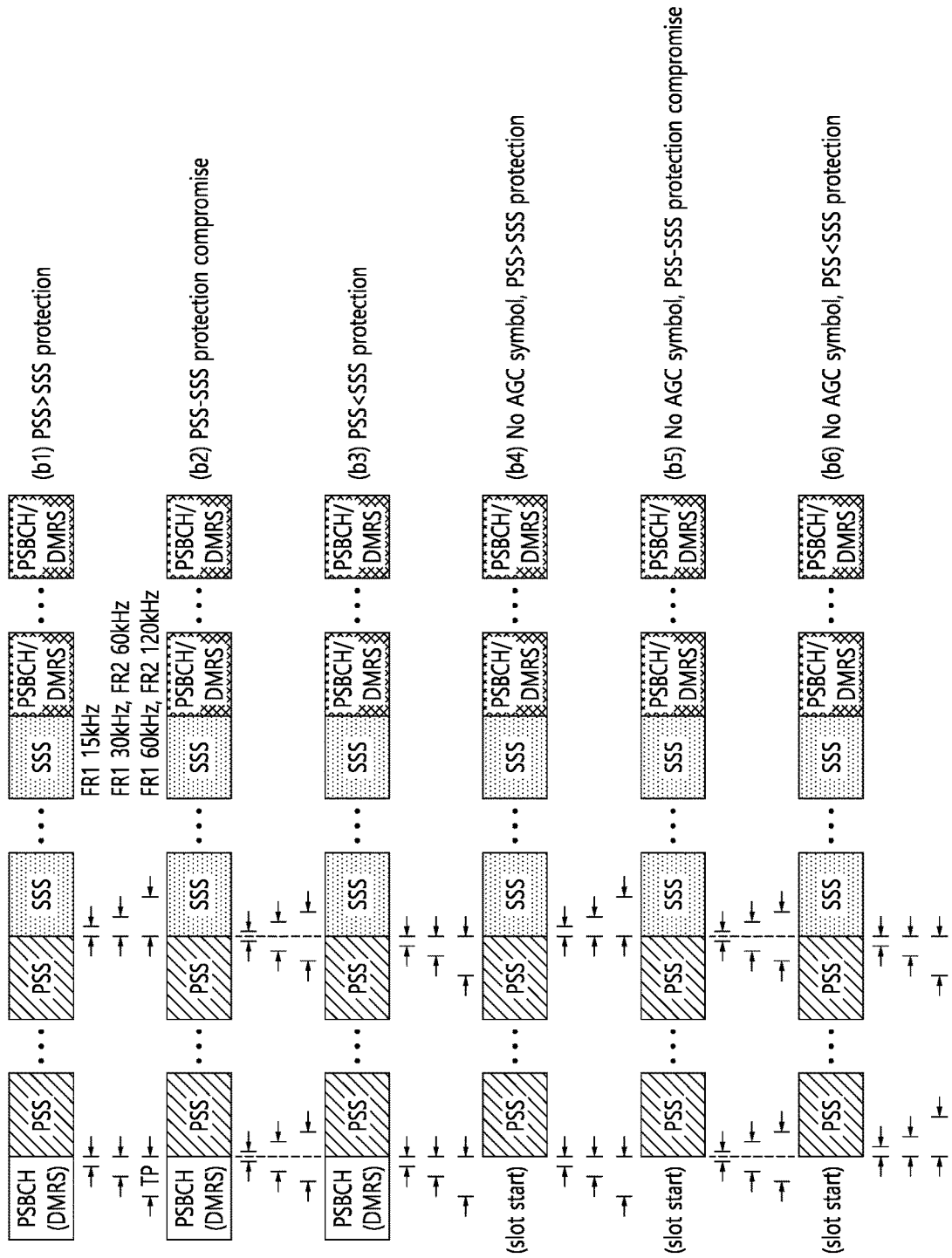
FIG. 13 shows examples of applying a transition period in which a PSBCH symbol period used as a guard period does not exist, based on an embodiment of the present disclosure.

FIG. 13 shows examples of applying a transition period in which a PSBCH symbol period used as a guard period does not exist, based on an embodiment of the present disclosure. The embodiment of FIG. 13 may be combined with various embodiments of the present disclosure.

The examples shown in FIG. 13 are examples in which a PSBCH symbol period used as a guard period does not exist between a PSS symbol period and a SSS symbol period.

Referring to FIG. 13, a period indicated by an arrow represents a transition period according to each transmission parameter. For example, the shortest length period represents a transition period corresponding to 15 kHz subcarrier spacing in FR1, and the middle length period represents a transition period corresponding to 30 kHz subcarrier spacing in FR1 or a transition period corresponding to 60 kHz subcarrier spacing in FR2, and the longest length period represents a transition period corresponding to 60 kHz subcarrier spacing in FR1 or a transition period corresponding to 120 kHz subcarrier spacing in FR2. For example, the number of PSS symbols, SSS symbols, and PSBCH symbols may be determined based on an amount of transmitted information, a required signal to noise ratio (SNR), and/or a time delay condition, etc.

Option (b1) shows an example in which the highest priority is applied to PSS protection. That is, it may be an example in which a time mask is applied based on a priority of PSS protection being higher than a priority of SSS protection. For example, a transition period may be configured/determined to be located in a part of a SSS symbol period. For example, SSS symbols may be configured to be included more in the SSB so that the UE can transmit more SSS in one SSB.

Option (b2) shows an example in which the same priority is applied to PSS protection and SSS protection. For example, half of a transition period may be configured/determined in a PSS symbol period, and half of the transition period may be configured/determined in a SSS symbol period.

Option (b3) shows an example in which a priority of SSS protection is higher than a priority of PSS protection. For example, a transition period between a PSS symbol period and a SSS symbol period may be configured/determined to be located in a part of the PSS symbol period. However, there may be a PSBCH symbol period used as an AGC symbol period in the preceding period of the first PSS symbol period. In this case, for example, a transition period may be configured/determined to be located in a part of the PSBCH symbol period used as the AGC symbol period.

Options (b4) to (b6) are different from options (b1) to (b3) in a case in which a PSBCH symbol used as an AGC symbol does not exist before the first PSS symbol period. In this case, the PSS may be mapped to the first symbol of the slot in which the UE starts SL transmission. Alternatively, the PSS may be mapped to any symbol in the slot related to SL transmission by the UE.

Option (b4) shows an example in which the highest priority is applied to PSS protection if there is no PSBCH symbol used as an AGC symbol. For example, it may be an example of applying a time mask based on a priority for PSS protection being higher than a priority for SSS protection. For example, a transition period may be configured/determined to be located in a part of a SSS symbol period. For example, as shown in FIG. 13, in the preceding period of the first PSS symbol period, a part of another symbol period used for sidelink communication may be configured/determined to be a transition period for PSS protection. For example, in the preceding period of the first PSS symbol period, a part of an uplink symbol period, a downlink symbol period, a gap symbol period, etc., may be configured/determined to be a transition period for PSS protection.

Option (b5) shows an example in which the same priority is applied to PSS protection and SSS protection if there is no PSBCH symbol used as an AGC symbol. For example, half of a transition period may be configured/determined in a PSS symbol period, and half of the transition period may be configured/determined in a SSS symbol period.

Option (b6) shows an example in which a priority of SSS protection is higher than a priority of PSS protection if there is no PSBCH symbol used as an AGC symbol. For example, a transition period between a PSS symbol period and a SSS symbol period may be configured/determined to be located in a part of the PSS symbol period. However, since performance degradation may occur due to the transition period configured in a part of the PSS symbol period, for example, more PSS symbols may be configured to be included in the SSB in order for the UE to transmit more PSS in one SSB, or the UE may use a lower code rate for the PSS symbol.

In the case of the third method, an optimal MPR may be applied to each signal period in consideration of different PAPR values of the PSS, the SSS, and the PSBCH. Accordingly, the UE transmits each signal with different average power, and in consideration of the difference in transmit power, the UE may apply a time mask to the PSS and the SSS, and the UE may apply a transition period to a pre-PSS period and a post-PSS period in a time domain. In this case, for example, the UE may apply the transition period based on characteristics of each of signals and a priority of information transmitted according to the purpose for which each of the signals is used in the communication system. For example, a priority of each signal included in the SSB may be determined based on the same criteria as in the above-described second method.

Hereinafter, examples of a transition period in consideration of guard period and protection of each signal based on the third method will be described.

Figure 14:
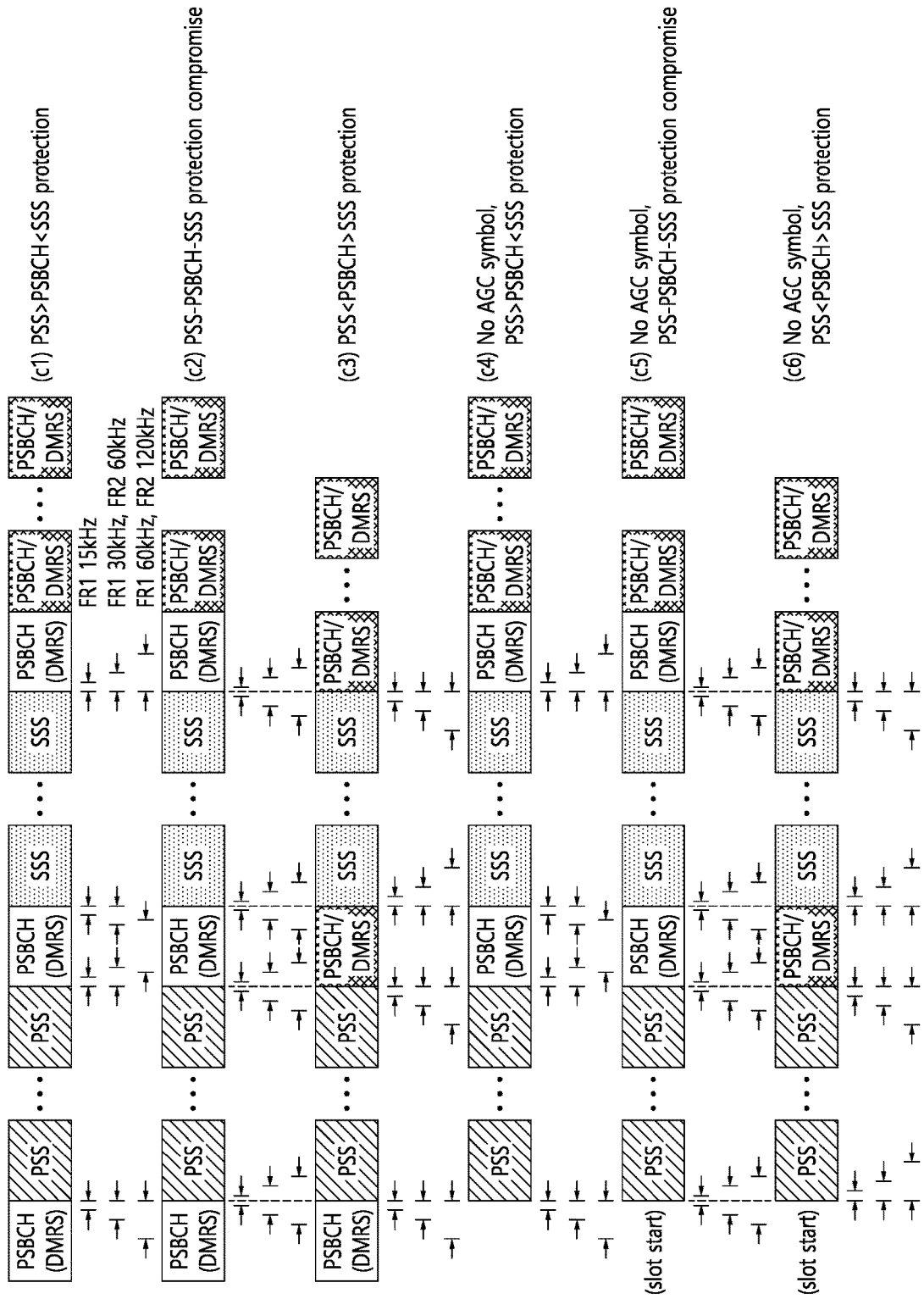
FIG. 14 shows examples of applying a transition period to a symbol period related to SSB, based on an embodiment of the present disclosure.

FIG. 14 shows examples of applying a transition period to a symbol period related to SSB, based on an embodiment of the present disclosure. The embodiment of FIG. 14 may be combined with various embodiments of the present disclosure.

Referring to FIG. 14, a period indicated by an arrow represents a transition period according to each transmission parameter. For example, the shortest length period represents a transition period corresponding to 15 kHz subcarrier spacing in FR1, and the middle length period represents a transition period corresponding to 30 kHz subcarrier spacing in FR1 or a transition period corresponding to 60 kHz subcarrier spacing in FR2, and the longest length period represents a transition period corresponding to 60 kHz subcarrier spacing in FR1 or a transition period corresponding to 120 kHz subcarrier spacing in FR2. For example, the number of PSS symbols, SSS symbols, and PSBCH symbols may be determined based on an amount of transmitted information, a required signal to noise ratio (SNR), and/or a time delay condition, etc.

Option (c1) shows an example in which PSS protection and SSS protection have higher priority than PSBCH protection. For example, a transition period may be configured/determined to be located in at least one of a PSBCH symbol period (e.g., AGC symbol) located before the first symbol period, a PSBCH symbol period located between a PSS symbol period and a SSS symbol period, or a PSBCH symbol period located after the last SSS symbol period. In this case, for example, the PSBCH symbol period may not include DMRS(s) in consideration of loss (e.g., deterioration of channel estimation performance) due to the transition period. Alternatively, for example, the PSBCH symbol period may include DMRS signal(s) if the loss according to the transition period is not large.

Option (c2) shows an example in which the same priority is applied to PSS protection, SSS protection, and PSBCH protection. For example, half of a transition period may be configured/determined in a PSS symbol period, a SSS symbol period, or a PSBCH symbol period, and half of the transition period may be configured/determined in the other symbol period.

Option (c3) shows an example in which a priority of PSBCH protection is higher than a priority of PSS protection and SSS protection. For example, a transition period between a PSS symbol period and a PSBCH symbol period may be configured/determined to be located in a part of the PSS symbol period, and a transition period between a SSS symbol period and a PSBCH symbol period may be configured/determined to be located in a part of the SSS symbol period. However, there may be a PSBCH symbol period used as an AGC symbol period in the preceding period of the first PSS symbol period. In this case, for example, a transition period may be configured/determined to be located in a part of the PSBCH symbol period used as the AGC symbol period. Since the reception performance of the PSBCH can be relatively improved by the priority applied to option (c3), for example, less PSBCH symbols may be configured to be included in the SSB in order for the UE to transmit less PSBCH in one SSB, or the UE may use a higher code rate for the PSBCH symbol.

Options (c4) to (c6) are different from options (c1) to (c3) in a case in which a PSBCH symbol used as an AGC symbol does not exist before the first PSS symbol period. In this case, the PSS may be mapped to the first symbol of the slot in which the UE starts SL transmission. Alternatively, the PSS may be mapped to any symbol in the slot related to SL transmission by the UE.

Option (c4) shows an example in which PSS and SSS protection have higher priority than PSBCH protection if there is no PSBCH symbol used as an AGC symbol. For example, a transition period may be configured/determined to be located in at least one of a PSBCH symbol period (e.g., AGC symbol) located before the first symbol period, a PSBCH symbol period located between a PSS symbol period and a SSS symbol period, or a PSBCH symbol period located after the last SSS symbol period. For example, as shown in FIG. 14, in the preceding period of the first PSS symbol period, a part of another symbol period used for sidelink communication may be configured/determined to be a transition period for PSS protection. For example, in the preceding period of the first PSS symbol period, a part of an uplink symbol period, a downlink symbol period, a gap symbol period, etc., may be configured/determined to be a transition period for PSS protection.

Option (c5) shows an example in which the same priority is applied to PSS protection, SSS protection, and PSBCH protection if there is no PSBCH symbol used as an AGC symbol. For example, half of a transition period may be configured/determined in a PSS symbol period, a SSS symbol period, or a PSBCH symbol period, and half of the transition period may be configured/determined in the other symbol period.

Option (c6) shows an example in which a priority of PSBCH protection is higher than a priority of PSS protection and SSS protection if there is no PSBCH symbol used as an AGC symbol. For example, a transition period between a PSS symbol period and a PSBCH symbol period may be configured/determined to be located in a part of the PSS symbol period, and a transition period between a SSS symbol period and a PSBCH symbol period may be configured/determined to be located in a part of the SSS symbol period. However, since performance degradation may occur due to the transition period configured in a part of the PSS symbol period and a part of the SSS symbol period, for example, more PSS symbols and more SSS symbols may be configured to be included in the SSB in order for the UE to transmit more PSS and more SSS in one SSB, or the UE may use a lower code rate for the PSS symbol and the SSS symbol. On the other hand, since the reception performance of the PSBCH can be relatively improved by the priority applied to option (c6), for example, less PSBCH symbols may be configured to be included in the SSB in order for the UE to transmit less PSBCH in one SSB, or the UE may use a higher code rate for the PSBCH symbol.

For example, since the transition period exists within the PSS symbol period and the SSS symbol period in options (c2), (c3), (c5), and (c6), more PSS symbols and more SSS symbols may be configured to be included in the SSB in order for the UE to transmit more PSS and more SSS in one SSB, or the UE may use a lower code rate for the PSS symbol and the SSS symbol.

Figure 15:
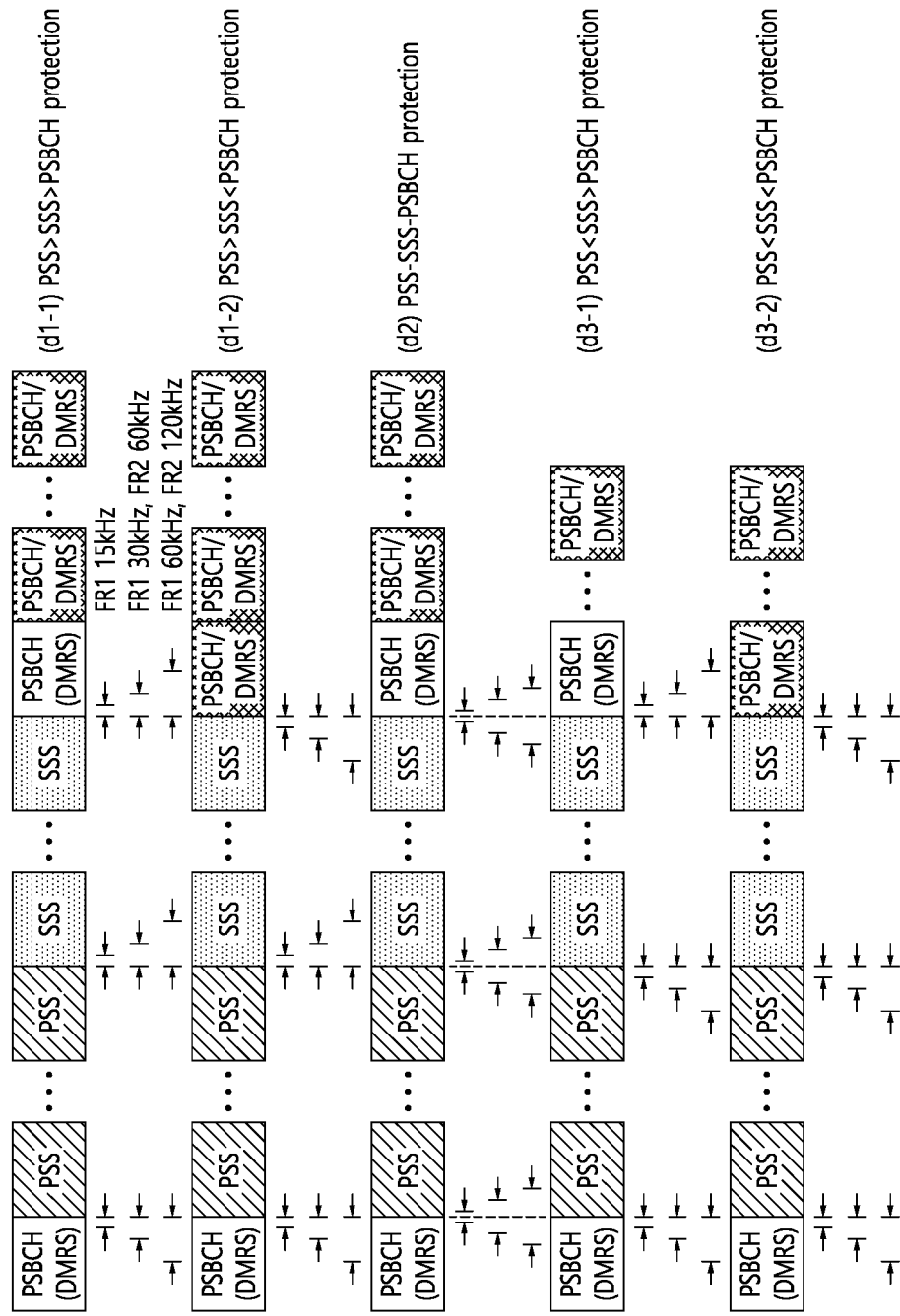
FIG. 15 shows examples of applying a transition period in which a PSBCH symbol period used as a guard period does not exist, based on an embodiment of the present disclosure.

FIG. 15 shows examples of applying a transition period in which a PSBCH symbol period used as a guard period does not exist, based on an embodiment of the present disclosure. The embodiment of FIG. 15 may be combined with various embodiments of the present disclosure.

The examples shown in FIG. 15 are examples in which a PSBCH symbol period used as a guard period does not exist between a PSS symbol period and a SSS symbol period.

Referring to FIG. 15, a period indicated by an arrow represents a transition period according to each transmission parameter. For example, the shortest length period represents a transition period corresponding to 15 kHz subcarrier spacing in FR1, and the middle length period represents a transition period corresponding to 30 kHz subcarrier spacing in FR1 or a transition period corresponding to 60 kHz subcarrier spacing in FR2, and the longest length period represents a transition period corresponding to 60 kHz subcarrier spacing in FR1 or a transition period corresponding to 120 kHz subcarrier spacing in FR2. For example, the number of PSS symbols, SSS symbols, and PSBCH symbols may be determined based on an amount of transmitted information, a required signal to noise ratio (SNR), and/or a time delay condition, etc.

Option (d1-1) shows an example in which the UE applies a time mask based on a priority configured in the order of PSS protection>SSS protection>PSBCH protection. That is, a priority for PSS protection is the highest, and a priority for SSS protection is lower than the priority for PSS protection, and a priority for PSBCH protection is lower than the priority for SSS protection. For example, the UE receiving the SSB may decode the SSS including synchronization signal ID after obtaining an initial synchronization based on the PSS. Thereafter, the UE receiving the SSB may perform synchronization based on decoding of the PSS and/or the SSS, and then decode the PSBCH including basic system information. Accordingly, in consideration of the above-described operation, a transition period may be configured/determined based on a priority configured in the order of PSS protection>SSS protection>PSBCH protection. For example, a transition period between a PSS symbol period and a SSS symbol period may be configured/determined to be located in a part of the SSS symbol period, and a transition period between the SSS symbol period and a PSBCH symbol period may be configured/determined to be located in a part of the PSBCH symbol period. For example, in the preceding period of the first PSS symbol period, a transition section may be configured to be located in a PSBCH symbol period used as an AGC symbol.

Option (d1-2) shows an example in which PSS protection and SSS protection have a lower priority than PSBCH protection, and PSS protection has a higher priority than SSS protection. For example, a transition period may be configured/determined to be located in a part of a SSS symbol period. For example, since performance degradation may occur due to the transition period configured in a part of the SSS symbol period, for example, more SSS symbols may be configured to be included in the SSB in order for the UE to transmit more SSS in one SSB, or the UE may use a lower code rate for the SSS symbol. On the other hand, since the reception performance of the PSBCH can be relatively improved by the priority applied to option (d1-2), for example, less PSBCH symbols may be configured to be included in the SSB in order for the UE to transmit less PSBCH in one SSB, or the UE may use a higher code rate for the PSBCH symbol.

Option (d2) shows an example in which the same priority is applied to PSS protection, SSS protection, and PSBCH protection. For example, half of a transition period may be configured/determined in a PSS symbol period, a SSS symbol period, or a PSBCH symbol period, and half of the transition period may be configured/determined in the other symbol period.

Option (d3-1) shows an example in which PSS protection and SSS protection have a higher priority than PSBCH protection, and SSS protection has a higher priority than PSS protection. For example, a transition period may be configured/determined to be located in a part of a PSS symbol period and a part of a PSBCH symbol period. For example, a transition period between a PSS symbol period and a PSBCH symbol period may be configured/determined to be located in a part of the PSBCH symbol period, and a transition period between the PSS symbol period and a SSS symbol period may be configured/determined to be located in a part of the PSS symbol period, and a transition period between the SSS symbol period and a PSBCH symbol period may be configured/determined to be located in the PSBCH symbol period.

Option (d3-2) shows an example in which the UE applies a time mask based on a priority configured in the order of PSBCH protection>SSS protection>PSS protection. That is, PSS protection and SSS protection have a lower priority than PSBCH protection, and SSS protection has a higher priority than PSS protection. In this case, by strengthening the protection of the PSBCH that transmits more information than the SSS, it is possible to guarantee the reception performance related to the acquisition of basic system information. For example, a transition period between a PSS symbol period and a SSS symbol period may be configured/determined to be located in a part of the PSS symbol period, and a transition period between the SSS symbol period and a PSBCH symbol period may be configured/determined to be located in a part of the SSS symbol period. For example, since the reception performance of the PSBCH can be relatively improved by the priority applied to option (d3-2), for example, less PSBCH symbols may be configured to be included in the SSB in order for the UE to transmit less PSBCH in one SSB, or the UE may use a higher code rate for the PSBCH symbol.

Figure 16:
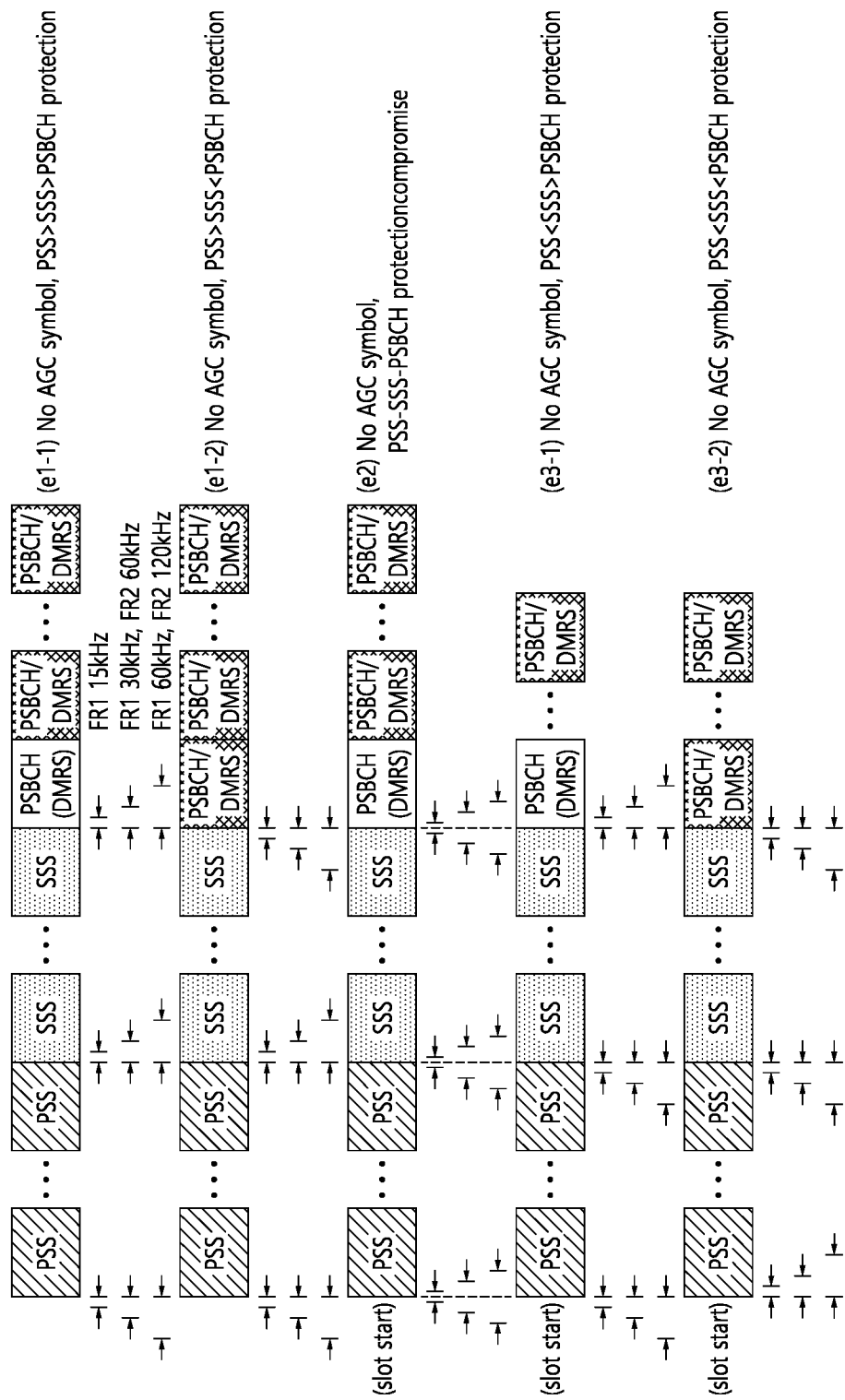
FIG. 16 shows examples of applying a transition period related to an SSB in which a PSBCH symbol used as an AGC symbol does not exist before the first PSS symbol period, based on an embodiment of the present disclosure.

FIG. 16 shows examples of applying a transition period related to an SSB in which a PSBCH symbol used as an AGC symbol does not exist before the first PSS symbol period, based on an embodiment of the present disclosure. The embodiment of FIG. 16 may be combined with various embodiments of the present disclosure.

In the examples shown in FIG. 16, a PSBCH symbol period used as a guard period is not applied between a PSS symbol period and a SSS symbol period, and there is no PSBCH symbol used as an AGC symbol before the first PSS symbol period. For example, if a PSBCH symbol used as an AGC symbol does not exist before the first PSS symbol period, the PSS may be mapped to the first symbol of the slot in which the UE starts SL transmission. Alternatively, the PSS may be mapped to any symbol in the slot related to SL transmission by the UE.

Referring to FIG. 16, a period indicated by an arrow represents a transition period according to each transmission parameter. For example, the shortest length period represents a transition period corresponding to 15 kHz subcarrier spacing in FR1, and the middle length period represents a transition period corresponding to 30 kHz subcarrier spacing in FR1 or a transition period corresponding to 60 kHz subcarrier spacing in FR2, and the longest length period represents a transition period corresponding to 60 kHz subcarrier spacing in FR1 or a transition period corresponding to 120 kHz subcarrier spacing in FR2. For example, the number of PSS symbols, SSS symbols, and PSBCH symbols may be determined based on an amount of transmitted information, a required signal to noise ratio (SNR), and/or a time delay condition, etc.

Option (e1-1) shows an example in which the UE applies a time mask based on a priority configured in the order of PSS protection>SSS protection>PSBCH protection, if there is no PSBCH symbol used as an AGC symbol before the first PSS symbol period. That is, a priority for PSS protection is the highest, and a priority for SSS protection is lower than the priority for PSS protection, and a priority for PSBCH protection is lower than the priority for SSS protection. For example, the UE receiving the SSB may decode the SSS including synchronization signal ID after obtaining an initial synchronization based on the PSS. Thereafter, the UE receiving the SSB may perform synchronization based on decoding of the PSS and/or the SSS, and then decode the PSBCH including basic system information. Accordingly, in consideration of the above-described operation, a transition period may be configured/determined based on a priority configured in the order of PSS protection>SSS protection>PSBCH protection. For example, a transition period between a PSS symbol period and a SSS symbol period may be configured/determined to be located in a part of the SSS symbol period, and a transition period between the SSS symbol period and a PSBCH symbol period may be configured/determined to be located in a part of the PSBCH symbol period. For example, as shown in FIG. 16, in the preceding period of the first PSS symbol period, a part of another symbol period used for sidelink communication may be configured/determined to be a transition period for PSS protection. For example, in the preceding period of the first PSS symbol period, a part of an uplink symbol period, a downlink symbol period, a gap symbol period, etc., may be configured/determined to be a transition period for PSS protection.

Option (e1-2) shows an example in which PSS protection and SSS protection have a lower priority than PSBCH protection, and PSS protection has a higher priority than SSS protection, if there is no PSBCH symbol used as an AGC symbol before the first PSS symbol period. For example, a transition period may be configured/determined to be located in a part of a SSS symbol period. For example, since performance degradation may occur due to the transition period configured in a part of the SSS symbol period, for example, more SSS symbols may be configured to be included in the SSB in order for the UE to transmit more SSS in one SSB, or the UE may use a lower code rate for the SSS symbol. On the other hand, since the reception performance of the PSBCH can be relatively improved by the priority applied to option (e1-2), for example, less PSBCH symbols may be configured to be included in the SSB in order for the UE to transmit less PSBCH in one SSB, or the UE may use a higher code rate for the PSBCH symbol.

Option (e2) shows an example in which the same priority is applied to PSS protection, SSS protection, and PSBCH protection, if there is no PSBCH symbol used as an AGC symbol before the first PSS symbol period. For example, half of a transition period may be configured/determined in a PSS symbol period, a SSS symbol period, or a PSBCH symbol period, and half of the transition period may be configured/determined in the other symbol period.

Option (e3-1) shows an example in which PSS protection and SSS protection have a higher priority than PSBCH protection, and SSS protection has a higher priority than PSS protection, if there is no PSBCH symbol used as an AGC symbol before the first PSS symbol period. For example, a transition period may be configured/determined to be located in a part of a PSS symbol period and a part of a PSBCH symbol period. For example, a transition period between a PSS symbol period and a PSBCH symbol period may be configured/determined to be located in a part of the PSBCH symbol period, and a transition period between the PSS symbol period and a SSS symbol period may be configured/determined to be located in a part of the PSS symbol period, and a transition period between the SSS symbol period and a PSBCH symbol period may be configured/determined to be located in the PSBCH symbol period. In this case, by strengthening the protection of the SSS transmitting more information than the PSS, the SSS reception performance of the UE receiving the SSS can be guaranteed.

Option (e3-2) shows an example in which the UE applies a time mask based on a priority configured in the order of PSBCH protection>SSS protection>PSS protection, if there is no PSBCH symbol used as an AGC symbol before the first PSS symbol period. That is, PSS protection and SSS protection have a lower priority than PSBCH protection, and SSS protection has a higher priority than PSS protection. In this case, by strengthening the protection of the PSBCH that transmits more information than the SSS, it is possible to guarantee the reception performance related to the acquisition of basic system information. For example, a transition period between a PSS symbol period and a SSS symbol period may be configured/determined to be located in a part of the PSS symbol period, and a transition period between the SSS symbol period and a PSBCH symbol period may be configured/determined to be located in a part of the SSS symbol period. For example, since the reception performance of the PSBCH can be relatively improved by the priority applied to option (e3-2), for example, less PSBCH symbols may be configured to be included in the SSB in order for the UE to transmit less PSBCH in one SSB, or the UE may use a higher code rate for the PSBCH symbol.

For example, the above-described time mask and/or transition period may be pre-configured between a transmitting UE and a receiving UE. For example, the transmitting UE may be a UE transmitting the SSB, and the receiving UE may be a UE receiving the SSB. For example, the transmitting UE may transmit time mask configuration information to the receiving UE through the PSS. For example, the time mask configuration information may include information related to an operation required in advance for the receiving UE to receive and decode PSS, SSS, and PSBCH signals. For example, the receiving UE may detect an initial synchronization signal through the PSS based on the time mask configuration information. After obtaining the synchronization, the receiving UE may receive the SSS and the PSBCH, and perform decoding on the SSS and the PSBCH. Accordingly, the receiving UE can improve the reception performance of the SSB based on the time mask configuration information.

Based on various embodiments of the present disclosure, when transmitting using different transmit powers according to characteristics of each signal included in the SSB used as the synchronization signal, MPR may be independently applied to maximize the reception performance of each signal. In addition, the transmitter amplifier of the UE may apply a time mask and a transition period for changing transmit power according to independently applied MPR to the symbol period of each signal. Accordingly, the transmitting UE may secure the maximum reception performance in terms of the receiving UE, and the receiving UE may improve reception performance based on configuration information related to a time mask pre-defined or signaled.

Figure 17:
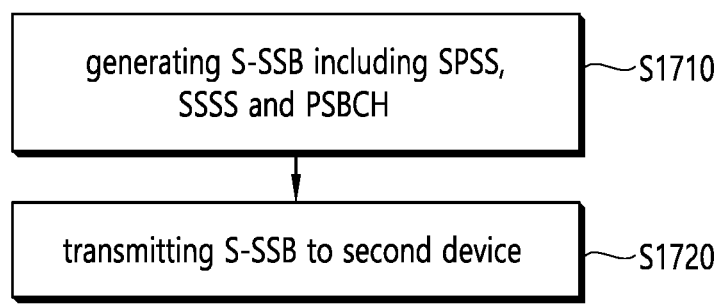
FIG. 17 shows a method for a first device (100) to generate a sidelink synchronization signal block (S-SSB) and transmit the S-SSB to a second device (200), based on an embodiment of the present disclosure.

FIG. 17 shows a method for a first device (100) to generate a sidelink synchronization signal block (S-SSB) and transmit the S-SSB to a second device (200), based on an embodiment of the present disclosure. The embodiment of FIG. 17 may be combined with various embodiments of the present disclosure.

Referring to FIG. 17, in step S1710, the first device (100) may generate a S-SSB including a sidelink primary synchronization signal (SPSS), a sidelink secondary synchronization signal (SSSS), and a sidelink physical broadcast channel (PSBCH). For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH. For example, the first device (100) may determine a length of the transition period based on a sub-carrier spacing related to a resource through which the S-SSB is transmitted. In the present disclosure, for example, the symbol period related to the SPSS may be refer to a symbol period adjacent to a SPSS symbol or may refer to a SPSS symbol period. Also, for example, the symbol period related to the SSSS may be refer to a symbol period adjacent to a SSSS symbol or may refer to a SSSS symbol period. Also, for example, the symbol period related to the PSBCH may be refer to a symbol period adjacent to a PSBCH symbol or may refer to a PSBCH symbol period.

For example, based on the priority of the SPSS being higher than the priority of the PSBCH, the transition period may be determined in a part of the symbol period related to the PSBCH. For example, based on the transition period being the part of the symbol period related to the PSBCH, the symbol period related to the PSBCH may not include a demodulation reference signal (DM-RS).

For example, based on the priority of the SPSS and the priority of the PSBCH being a same, the transition period may be determined to be half of the symbol period related to the SPSS and half of the symbol period related to the PSBCH. For example, based on the priority of the PSBCH being higher than the priority of the SPSS, the transition period may be determined in a part of the symbol period related to the SPSS. For example, based on the transition period being the part of the symbol period related to the SPSS, a symbol related to the SPSS may be further included in the S-SSB. For example, based on an existence of an automatic gain control (AGC) symbol period before a symbol period related to a first SPSS, the transition period may be determined in a part of the AGC symbol period.

For example, based on the priority of the SPSS, the priority of the SSSS and the priority of the PSBCH being a same, the transition period may be determined to be half of the symbol period related to the SPSS, half of the symbol period related to the SSSS, or half of the symbol period related to the PSBCH.

For example, based on the priority of the PSBCH being higher than the priority of the SPSS and the priority of the SSSS, the transition period may be determined in a part of the symbol period related to the SPSS and a part of the symbol period related to the SSSS.

For example, based on the priority of the SPSS being higher than the priority of the SSSS, a first transition period may be determined in a part of the symbol period related to the SSSS. For example, based on the priority of the SSSS being higher than the priority of the PSBCH, a second transition period may be determined in a part of the symbol period related to the PSBCH. For example, the first transition period may be a transition period between the symbol period related to the SPSS and the symbol period related to the SSSS. For example, the second transition period may be a transition period between the symbol period related to the SSSS and the symbol period related to the PSBCH.

For example, the transition period may be determined based on the absence of the symbol period related to the PSBCH between the symbol period related to the SPSS and the symbol period related to the SSSS. In this case, for example, based on the priority of the SPSS being higher than the priority of the SSSS, the transition period may be determined in a part of the symbol period related to the SSSS. For example, based on the priority of the SPSS being the same as the priority of the SSSS, the transition period may be determined to be half of the symbol period related to the SPSS and half of the symbol period related to the SSSS.

In step S1720, the first device (100) may transmit the S-SSB to the second device (200). For example, the first device (100) may transmit configuration information related to the transition period of the S-SSB to the second device (200). For example, information related to the transition period of the S-SSB may be configured for the first device (100) in advance.

The proposed method can be applied to device(s) described below. First, the processor (102) of the first device (100) may generate a S-SSB including a sidelink primary synchronization signal (SPSS), a sidelink secondary synchronization signal (SSSS), and a sidelink physical broadcast channel (PSBCH). In addition, the processor (102) of the first device (100) may control the transceiver (106) to transmit the S-SSB to the second device (200).

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: generate a sidelink synchronization signal block (S-SSB) including a sidelink primary synchronization signal (SPSS), a sidelink secondary synchronization signal (SSSS) and a sidelink physical broadcast channel (PSBCH); and transmit, to a second device, the S-SSB. For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: generate a sidelink synchronization signal block (S-SSB) including a sidelink primary synchronization signal (SPSS), a sidelink secondary synchronization signal (SSSS) and a sidelink physical broadcast channel (PSBCH); and transmit, to a second UE, the S-SSB. For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH.

Based on an embodiment of the present disclosure, a non-transitory computer-readable storage medium storing instructions may be provided. For example, the instructions, when executed, may cause a first device to: generate a sidelink synchronization signal block (S-SSB) including a sidelink primary synchronization signal (SPSS), a sidelink secondary synchronization signal (SSSS) and a sidelink physical broadcast channel (PSBCH); and transmit, to a second device, the S-SSB. For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH.

FIG. 18 shows a method for a second device (200) to receive a S-SSB from a first device (100), based on an embodiment of the present disclosure. The embodiment of FIG. 18 may be combined with various embodiments of the present disclosure.

Referring to FIG. 18, in step S1810, the second device (200) may receive a S-SSB including a SPSS, a SSSS, and a PSBCH from the first device (100). For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH.

For example, based on the priority of the SPSS being higher than the priority of the PSBCH, the transition period may be determined in a part of the symbol period related to the PSBCH. For example, based on the transition period being the part of the symbol period related to the PSBCH, the symbol period related to the PSBCH may not include a demodulation reference signal (DM-RS).

For example, based on the priority of the SPSS and the priority of the PSBCH being a same, the transition period may be determined to be half of the symbol period related to the SPSS and half of the symbol period related to the PSBCH. For example, based on the priority of the PSBCH being higher than the priority of the SPSS, the transition period may be determined in a part of the symbol period related to the SPSS. For example, based on the transition period being the part of the symbol period related to the SPSS, a symbol related to the SPSS may be further included in the S-SSB. For example, based on an existence of an automatic gain control (AGC) symbol period before a symbol period related to a first SPSS, the transition period may be determined in a part of the AGC symbol period.

For example, based on the priority of the SPSS, the priority of the SSSS and the priority of the PSBCH being a same, the transition period may be determined to be half of the symbol period related to the SPSS, half of the symbol period related to the SSSS, or half of the symbol period related to the PSBCH.

For example, based on the priority of the PSBCH being higher than the priority of the SPSS and the priority of the SSSS, the transition period may be determined in a part of the symbol period related to the SPSS and a part of the symbol period related to the SSSS.

For example, based on the priority of the SPSS being higher than the priority of the SSSS, a first transition period may be determined in a part of the symbol period related to the SSSS. For example, based on the priority of the SSSS being higher than the priority of the PSBCH, a second transition period may be determined in a part of the symbol period related to the PSBCH. For example, the first transition period may be a transition period between the symbol period related to the SPSS and the symbol period related to the SSSS. For example, the second transition period may be a transition period between the symbol period related to the SSSS and the symbol period related to the PSBCH.

For example, the transition period may be determined based on the absence of the symbol period related to the PSBCH between the symbol period related to the SPSS and the symbol period related to the SSSS. In this case, for example, based on the priority of the SPSS being higher than the priority of the SSSS, the transition period may be determined in a part of the symbol period related to the SSSS. For example, based on the priority of the SPSS being the same as the priority of the SSSS, the transition period may be determined to be half of the symbol period related to the SPSS and half of the symbol period related to the SSSS.

For example, the second device (200) may receive configuration information related to the transition period of the S-SSB from the first device (100). For example, information related to the transition period of the S-SSB may be configured for the second device (200) in advance.

The proposed method can be applied to device(s) described below. For example, the processor (202) of the second device (200) may control the transceiver (206) to receive a S-SSB including a SPSS, a SSSS, and a PSBCH from the first device (100).

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a sidelink synchronization signal block (S-SSB) including a sidelink primary synchronization signal (SPSS), a sidelink secondary synchronization signal (SSSS) and a sidelink physical broadcast channel (PSBCH). For example, at least one of a symbol period related to the SPSS, a symbol period related to the SSSS, or a symbol period related to the PSBCH may include a transition period. For example, the transition period may be determined based on at least one of a priority of the SPSS, a priority of the SSSS, or a priority of the PSBCH.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
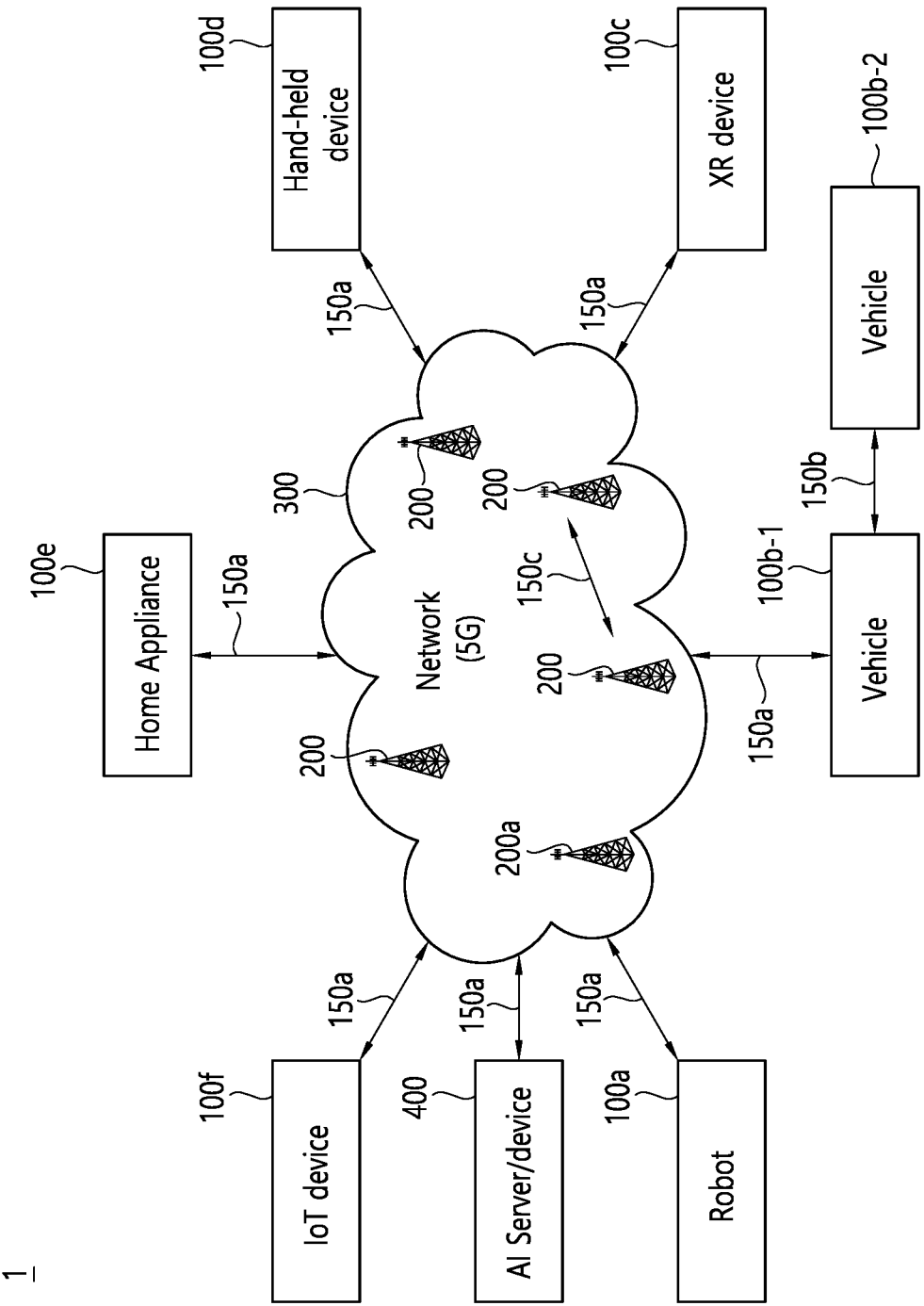
FIG. 19 shows a communication system (1), based on an embodiment of the present disclosure.

FIG. 19 shows a communication system 1, based on an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
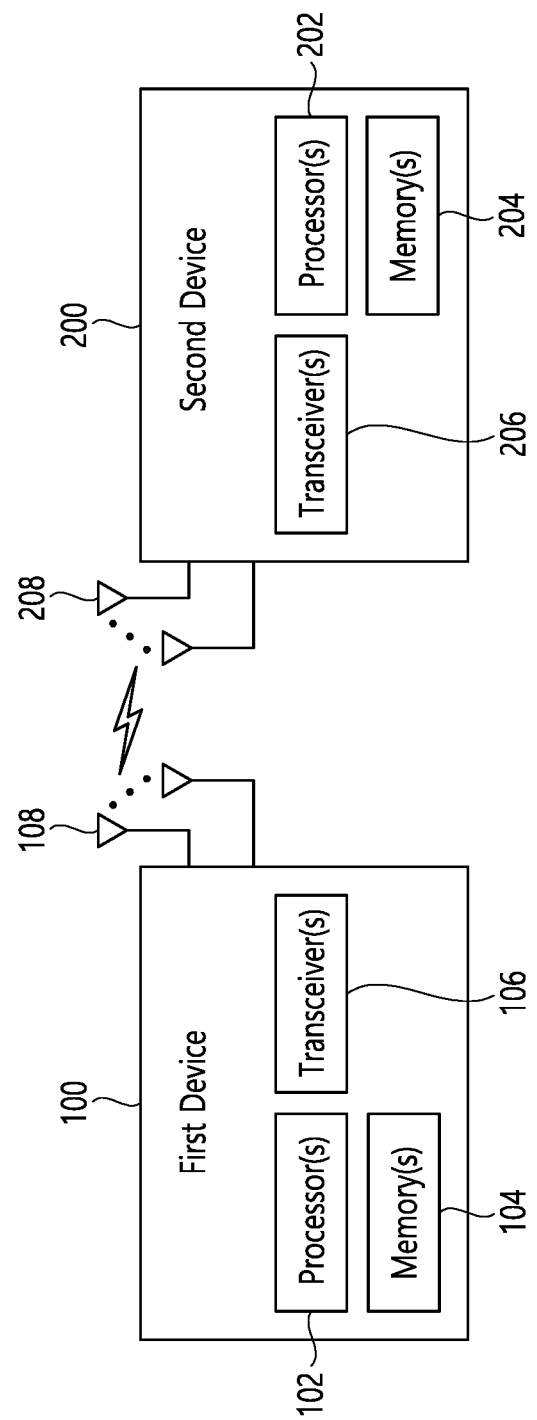
FIG. 20 shows wireless devices, based on an embodiment of the present disclosure.

FIG. 20 shows wireless devices, based on an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
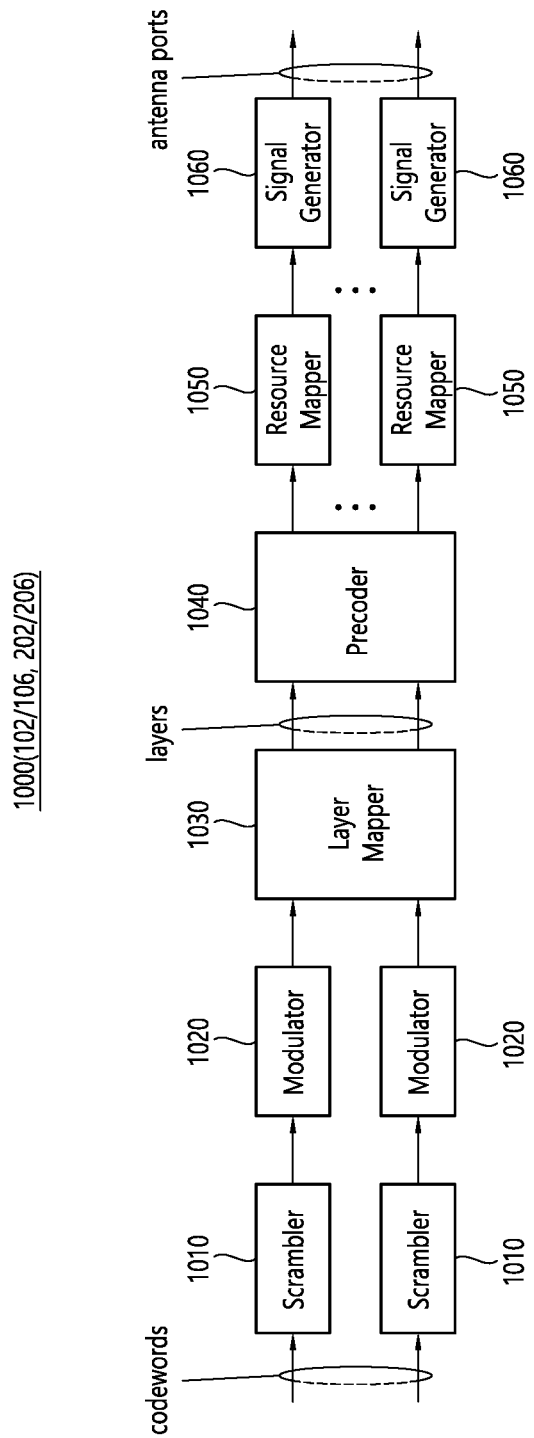
FIG. 21 shows a signal process circuit for a transmission signal, based on an embodiment of the present disclosure.

FIG. 21 shows a signal process circuit for a transmission signal, based on an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2–BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT)

modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
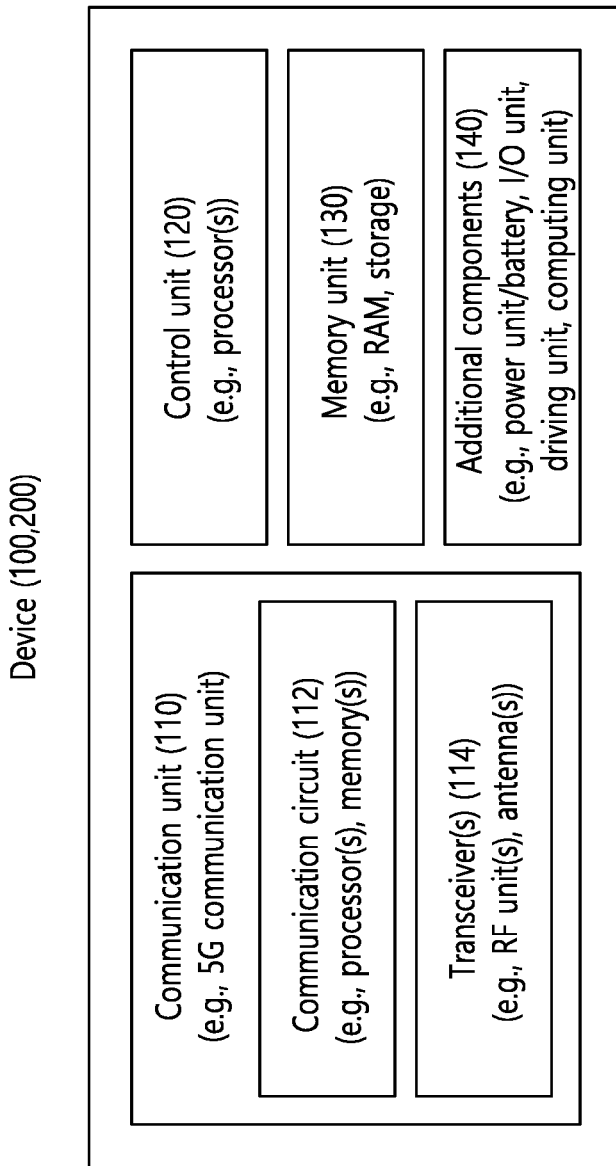
FIG. 22 shows another example of a wireless device, based on an embodiment of the present disclosure.

FIG. 22 shows another example of a wireless device, based on an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
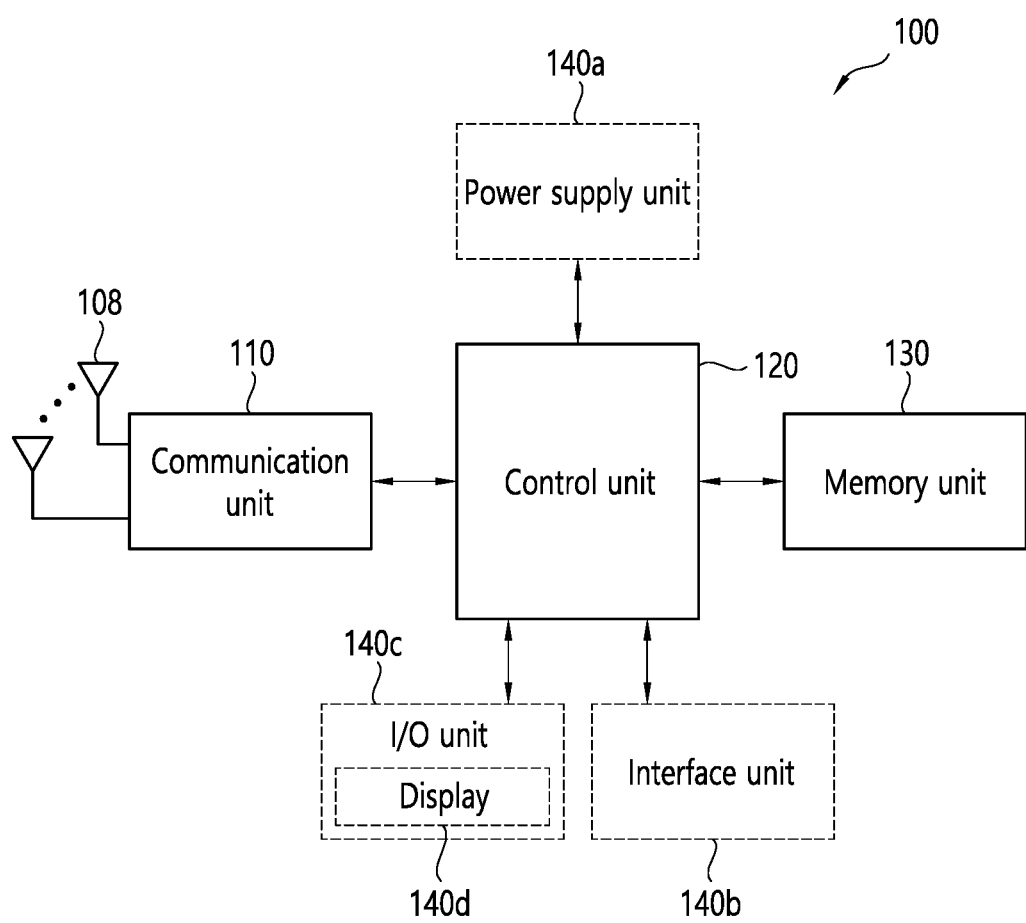
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
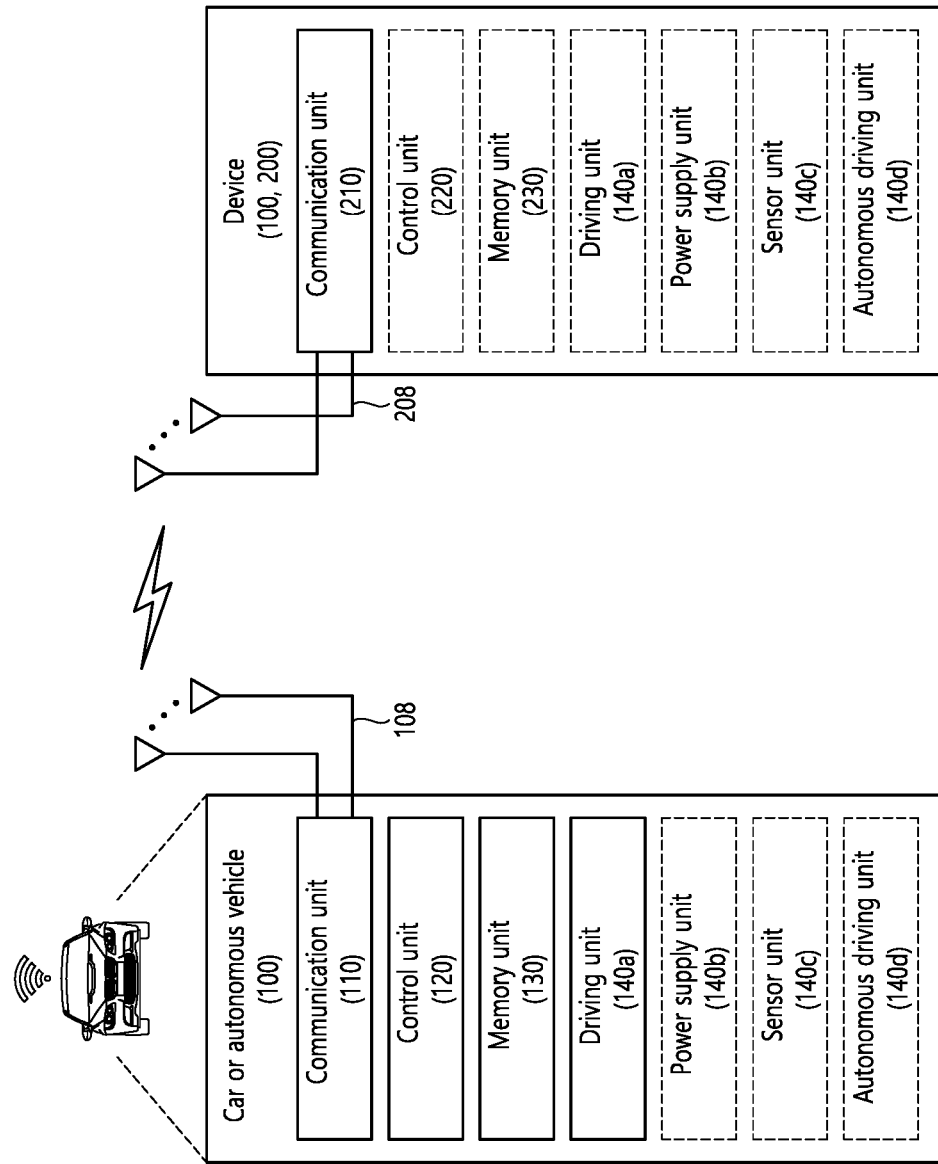
FIG. 24 shows a vehicle or an autonomous vehicle, based on an embodiment of the present disclosure.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   generating a sidelink synchronization signal block (S-SSB) including a sidelink primary synchronization signal (SPSS), a sidelink secondary synchronization signal (SSSS) and a sidelink physical broadcast channel (PSBCH); and
   transmitting, to a second device, the S-SSB,
   wherein at least one of a symbol period related to the SPSS, a symbol period related to the SSSS, or a symbol period related to the PSBCH includes a transition period,
   wherein the transition period is determined based on at least one of a priority of the SPSS, a priority of the SSSS, or a priority of the PSBCH, and
   wherein, based on an existence of an automatic gain control (AGC) symbol period before a symbol period related to a first SPSS, the transition period is determined in a part of the AGC symbol period.

2. The method of claim 1, further comprising:
   determining a length of the transition period based on a sub-carrier spacing related to a resource through which the S-SSB is transmitted.

3. The method of claim 1, wherein, based on the priority of the SPSS being higher than the priority of the PSBCH, the transition period is determined in a part of the symbol period related to the PSBCH.

4. The method of claim 3, wherein, based on the transition period being the part of the symbol period related to the PSBCH, the symbol period related to the PSBCH does not include a demodulation reference signal (DM-RS).

5. The method of claim 1, wherein, based on the priority of the SPSS and the priority of the PSBCH being a same, the transition period is determined to be half of the symbol period related to the SPSS and half of the symbol period related to the PSBCH.

6. The method of claim 1, wherein, based on the priority of the PSBCH being higher than the priority of the SPSS, the transition period is determined in a part of the symbol period related to the SPSS.

7. The method of claim 6, wherein, based on the transition period being the part of the symbol period related to the SPSS, a symbol related to the SPSS is further included in the S-SSB.

8. The method of claim 1, wherein, based on the priority of the SPSS being a same as the priority of the SSSS, the transition period is determined to be half of the symbol period related to the SPSS and half of the symbol period related to the SSSS, and
   wherein the transition period is determined based on absence of the symbol period related to the PSBCH between the symbol period related to the SPSS and the symbol period related to the SSSS.

9. The method of claim 1, wherein, based on the priority of the SPSS, the priority of the SSSS and the priority of the PSBCH being a same, the transition period is determined to be half of the symbol period related to the SPSS, half of the symbol period related to the SSSS, or half of the symbol period related to the PSBCH.

10. The method of claim 1, wherein, based on the priority of the PSBCH being higher than the priority of the SPSS and the priority of the SSSS, the transition period is determined in a part of the symbol period related to the SPSS and a part of the symbol period related to the SSSS.

11. The method of claim 1, wherein, based on the priority of the SPSS being higher than the priority of the SSSS, a first transition period is determined in a part of the symbol period related to the SSSS,
wherein, based on the priority of the SSSS being higher than the priority of the PSBCH, a second transition period is determined in a part of the symbol period related to the PSBCH,
wherein the first transition period is a transition period between the symbol period related to the SPSS and the symbol period related to the SSSS, and
wherein the second transition period is a transition period between the symbol period related to the SSSS and the symbol period related to the PSBCH.

12. The method of claim 1, wherein, based on the priority of the SPSS being higher than the priority of the SSSS, the transition period is determined in a part of the symbol period related to the SSSS, and
wherein the transition period is determined based on absence of the symbol period related to the PSBCH between the symbol period related to the SPSS and the symbol period related to the SSSS.

13. An apparatus configured to control a first user equipment (UE), the apparatus comprising:
one or more processors; and
one or more memories operably connected to the one or more processors and storing instructions, wherein the one or more processors execute the instructions to:
generate a sidelink synchronization signal block (S-SSB) including a sidelink primary synchronization signal (SPSS), a sidelink secondary synchronization signal (SSSS) and a sidelink physical broadcast channel (PSBCH); and
transmit, to a second UE, the S-SSB,
wherein at least one of a symbol period related to the SPSS, a symbol period related to the SSSS, or a symbol period related to the PSBCH includes a transition period,
wherein the transition period is determined based on at least one of a priority of the SPSS, a priority of the SSSS, or a priority of the PSBCH, and
wherein, based on an existence of an automatic gain control (AGC) symbol period before a symbol period related to a first SPSS, the transition period is determined in a part of the AGC symbol period.

14. A first device configured to perform wireless communication, the first device comprising:
one or more memories storing instructions;
one or more transceivers; and
one or more processors connected to the one or more memories and the one or more transceivers, wherein the one or more processors execute the instructions to:
generate a sidelink synchronization signal block (S-SSB) including a sidelink primary synchronization signal (SPSS), a sidelink secondary synchronization signal (SSSS) and a sidelink physical broadcast channel (PSBCH); and
transmit, to a second device, the S-SSB,
wherein at least one of a symbol period related to the SPSS, a symbol period related to the SSSS, or a symbol period related to the PSBCH includes a transition period,
wherein the transition period is determined based on at least one of a priority of the SPSS, a priority of the SSSS, or a priority of the PSBCH, and
wherein, based on an existence of an automatic gain control (AGC) symbol period before a symbol period related to a first SPSS, the transition period is determined in a part of the AGC symbol period.

15. The first device of claim 14, wherein, based on the priority of the SPSS being higher than the priority of the PSBCH, the transition period is determined in a part of the symbol period related to the PSBCH.

16. The first device of claim 15, wherein, based on the transition period being the part of the symbol period related to the PSBCH, the symbol period related to the PSBCH does not include a demodulation reference signal (DM-RS).

17. The first device of claim 14, wherein, based on the priority of the SPSS and the priority of the PSBCH being a same, the transition period is determined to be half of the symbol period related to the SPSS and half of the symbol period related to the PSBCH.

18. The first device of claim 14, wherein, based on the priority of the PSBCH being higher than the priority of the SPSS, the transition period is determined in a part of the symbol period related to the SPSS.

19. The first device of claim 18, wherein, based on the transition period being the part of the symbol period related to the SPSS, a symbol related to the SPSS is further included in the S-SSB.

* * * * *